(12) United States Patent
Sakai et al.

(10) Patent No.: US 10,512,078 B2
(45) Date of Patent: Dec. 17, 2019

(54) RADIO COMMUNICATION APPARATUS

(71) Applicant: SONY CORPORATION, Tokyo (JP)

(72) Inventors: Eisuke Sakai, Tokyo (JP); Tomoya Yamaura, Tokyo (JP); Kazuyuki Sakoda, Chiba (JP)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 15/521,289

(22) PCT Filed: Aug. 5, 2015

(86) PCT No.: PCT/JP2015/072191
§ 371 (c)(1),
(2) Date: Apr. 22, 2017

(87) PCT Pub. No.: WO2016/067701
PCT Pub. Date: May 6, 2016

(65) Prior Publication Data
US 2017/0318581 A1    Nov. 2, 2017

(30) Foreign Application Priority Data

Oct. 31, 2014    (JP) ................................ 2014-223273

(51) Int. Cl.
*H04J 3/04*    (2006.01)
*H04W 72/04*  (2009.01)
(Continued)

(52) U.S. Cl.
CPC ...... *H04W 72/0446* (2013.01); *H04B 7/0632* (2013.01); *H04W 16/28* (2013.01);
(Continued)

(58) Field of Classification Search
CPC ... H04L 1/0067; H04L 69/324; H04L 1/0057; H04L 1/1685; H04L 29/08; H04L 1/08;
(Continued)

(56) References Cited

U.S. PATENT DOCUMENTS 8,559,371 B2 * 10/2013 Wu .......................... H04L 5/02
                                                            370/328
8,681,793 B2 *  3/2014 Seok .................. H04W 72/046
                                                            370/392
(Continued)

FOREIGN PATENT DOCUMENTS

AU    2010245594 A1    11/2011
BR    PI1016144 A2      4/2016
(Continued)

OTHER PUBLICATIONS

NTT Docomo, Inc., "Padding Triggered RLC Status Reporting", 3GPP TSG-RAN WG2 #79, R2-123723, Qingdao, China, Aug. 13-17, 2012, pp. 1-4.

(Continued)

*Primary Examiner* — Hanh N Nguyen
(74) *Attorney, Agent, or Firm* — Chip Law Group

(57) ABSTRACT

Provided is a radio communication apparatus including a radio communication unit that performs radio communication with another radio communication apparatus, and a control unit that controls processing of adding information which can be used for communication by the another radio communication apparatus which is a transmission destination to a frame within such a range that transmission is possible using an assigned radio resource.

17 Claims, 15 Drawing Sheets

(51) Int. Cl.
*H04W 16/28* (2009.01)
*H04B 7/06* (2006.01)
*H04W 28/06* (2009.01)
*H04W 84/12* (2009.01)
*H04B 7/0452* (2017.01)

(52) U.S. Cl.
CPC ........... *H04W 28/06* (2013.01); *H04B 7/0452* (2013.01); *H04W 84/12* (2013.01)

(58) Field of Classification Search
CPC ....... H04L 5/02; H04L 1/1854; H04B 7/0452; H04W 72/0446; H04W 16/28; H04W 84/02; H04W 84/12
See application file for complete search history.

(56) References Cited

U.S. PATENT DOCUMENTS

| | | | |
|---|---|---|---|
| 9,712,336 B2 * | 7/2017 | Morioka | ............... H04W 28/06 |
| 2008/0101211 A1 * | 5/2008 | Rao | ....................... H04L 1/1854 370/206 |
| 2009/0196364 A1 | 8/2009 | Nakajima et al. | |
| 2012/0051335 A1 | 3/2012 | Kimura et al. | |
| 2015/0230131 A1 | 8/2015 | Kimura et al. | |
| 2015/0319645 A1 | 11/2015 | Nakajima et al. | |
| 2017/0163514 A1 | 6/2017 | Nakajima et al. | |
| 2017/0250784 A1 * | 8/2017 | Sakai | ....................... H04L 1/08 |
| 2017/0311202 A1 | 10/2017 | Kimura et al. | |

FOREIGN PATENT DOCUMENTS

| | | |
|---|---|---|
| CA | 2759903 A1 | 11/2010 |
| CN | 102428726 A | 4/2012 |
| CN | 105101297 A | 11/2015 |
| EP | 2429234 A1 | 3/2012 |
| EP | 3282750 A1 | 2/2018 |
| ES | 2657838 T3 | 3/2018 |
| JP | 2005-509316 A | 4/2005 |
| JP | 2006-081172 A | 3/2006 |
| JP | 2009-164751 A | 7/2009 |
| JP | 2010-178024 A | 8/2010 |
| JP | 2010-263490 A | 11/2010 |
| JP | 2011-091784 A | 5/2011 |
| JP | 4996451 B2 | 8/2012 |
| JP | 5493459 B2 | 5/2014 |
| KR | 10-2012-0022852 A | 3/2012 |
| WO | 2006/106613 A1 | 10/2006 |
| WO | 2008/001727 A1 | 1/2008 |
| WO | 2010/128621 A1 | 11/2010 |
| ZA | 201106087 B | 3/2012 |

OTHER PUBLICATIONS

Office Action for CN Patent Application No. 201580057242.7, dated Jul. 4, 2018, 07 pages of Office Action and 25 pages of English Translation.

Extended European Search Report of EP Patent Application No. 15855658.9, dated May 24, 2018, 08 pages.

"Padding triggered RLC status reporting", 3GPP TSG-RAN WG2 #79, Qingdao, China, Tdoc R2-123723, NTT Docomo, Inc., Aug. 13-17, 2012, 04 pages.

Office Action for JP Patent Application No. 2016-556399, dated Sep. 24, 2019, 9 pages of Office Action and 8 pages of English Translation.

\* cited by examiner

RADIO COMMUNICATION APPARATUS

CROSS REFERENCE TO RELATED APPLICATIONS

This application is a U.S. National Phase of International Patent Application No. PCT/JP2015/072191 filed on Aug. 5, 2015, which claims priority benefit of Japanese Patent Application No. JP 2014-223273 filed in the Japan Patent Office on Oct. 31, 2014. Each of the above-referenced applications is hereby incorporated herein by reference in its entirety.

TECHNICAL FIELD

The present disclosure relates to a radio communication apparatus.

BACKGROUND ART

In recent years, a wireless local area network (LAN) typified by Institute of Electrical and Electronics Engineers (IEEE) 802.11 has been spread, and, in accordance with the spread, an information amount of content to be transmitted and products supporting the wireless LAN have increased. Therefore, in order to improve communication efficiency of an entire network, standards of IEEE 802.11 are currently still expanded.

As an example of expansion of the standards, in 802.11ac standards, multi-user multi-input multi-output (MU-MIMO) for downlink (DL) is employed. MU-MIMO is a technology which enables a plurality of signals to be transmitted in the same time slot by space division multiplexing, and, with this technology, it is possible to, for example, improve utilization efficiency of frequencies.

However, there is a case where transmission periods of frames transmitted by a plurality of communication apparatuses are different, in which case, the number of times of multiplexing of frames received during a reception period of the frames increases or decreases. Therefore, reception power at a communication apparatus which receives the multiplexed frame changes during the reception period, and change of the reception power can affect reception performance. To address this, a method for making transmission periods of frames the same is proposed.

For example, Patent Literature 1 discloses a communication apparatus which makes transmission periods of a plurality of frames the same by adding padding to the plurality of frames having different transmission periods as appropriate.

CITATION LIST

Patent Literature

Patent Literature 1: JP 2010-263490A

DISCLOSURE OF INVENTION

Technical Problem

However, with the technology disclosed in Patent Literature 1, there is a case where it is difficult to efficiently utilize radio resources. For example, with the technology disclosed in Patent Literature 1, radio resources are consumed by padding which is meaningless as data.

Therefore, the present disclosure proposes a new and improved radio communication apparatus which can realize effective utilization of radio resources.

Solution to Problem

According to the present disclosure, there is provided a radio communication apparatus including: a radio communication unit configured to perform radio communication with another radio communication apparatus; and a control unit configured to control processing of adding information which can be used for communication by the another radio communication apparatus which is a transmission destination to a frame within such a range that transmission is possible using an assigned radio resource.

According to the present disclosure, there is provided a radio communication apparatus including: a radio communication unit configured to perform radio communication with another radio communication apparatus; and a control unit configured to acquire information which is added within such a range that transmission is possible using a radio resource assigned to the another radio communication apparatus and which can be used for communication by the radio communication unit, from a frame received by the radio communication unit.

Advantageous Effects of Invention

As described above, according to the present disclosure, it is possible to realize effective utilization of radio resources. Note that the effects described above are not necessarily limitative. With or in the place of the above effects, there may be achieved any one of the effects described in this specification or other effects that may be grasped from this specification.

MODES FOR CARRYING OUT THE INVENTION

Figure 1:
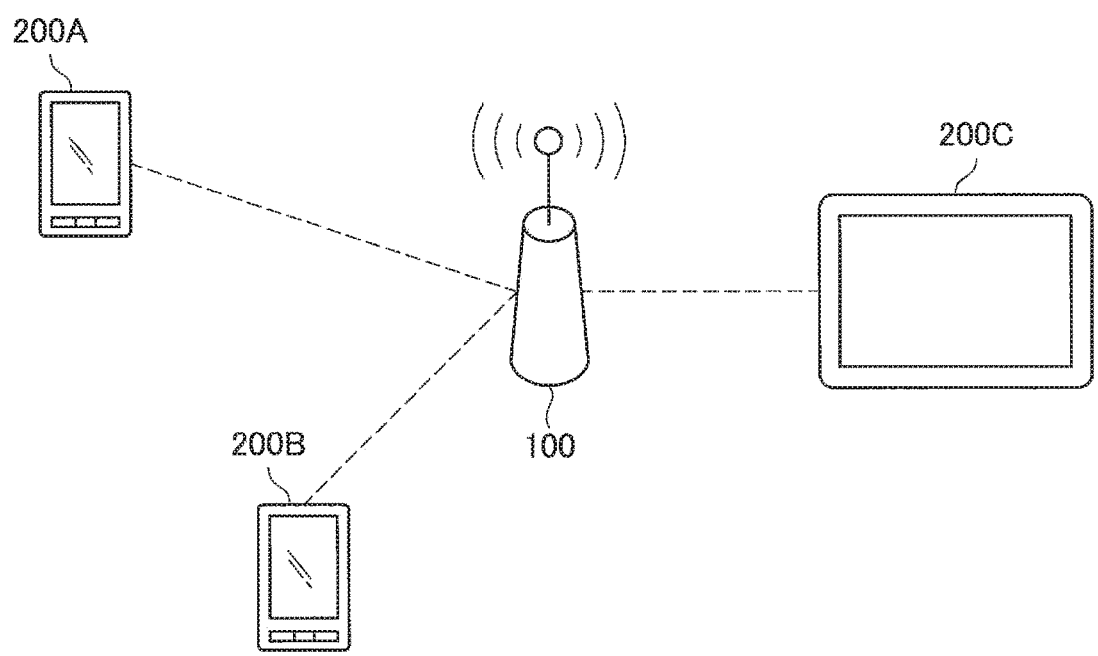
FIG. 1 is a diagram illustrating a configuration example of a radio communication system according to an embodiment of the present disclosure.

Hereinafter, preferred embodiments of the present disclosure will be described in detail with reference to the appended drawings. In this specification and the appended drawings, structural elements that have substantially the same function and structure are denoted with the same reference numerals, and repeated explanation of these structural elements is omitted.

Also, in the present description and drawings, a plurality of elements having substantially the same functional configuration may be distinguished from each other by each of the elements having a different alphabetical letter added to the end of the same reference numeral. For example, a plurality of elements having substantially the same functional configuration may be distinguished from each other as necessary, such as the STAs 200A, 200B, and 200C. However, if it is not particularly necessary to distinguish each of a plurality of structural elements having substantially the same functional configuration, only the same reference numeral is assigned. For example, if it is not particularly necessary to distinguish between the STAs 200A, 200B, and 200C, they are simply referred to as the STA 200.

Note that description will be provided in the following order.

1. Outline
2. First Embodiment
2-1. Configuration example of AP
2-2. Configuration example of STA
2-3. Operation processing example
3. Second Embodiment
3-1. Configuration example of AP
3-2. Configuration example of STA
3-3. Operation processing example
4. Third Embodiment
4-1. Configuration example of AP
4-2. Configuration example of STA
5. Application example
6. Conclusion <1. Outline>

Outline of a radio communication system according to an embodiment of the present disclosure will be described first with reference to FIG. 1.

FIG. 1 is a diagram illustrating a configuration example of a radio communication system 1 according to an embodiment of the present disclosure. As illustrated in FIG. 1, the radio communication system 1 includes a base station 100 and a plurality of terminal apparatuses 200. The base station 100 is a radio communication apparatus which operates as an access point (hereinafter, also referred to as an access point (AP)) and provides radio communication service to one or more terminal apparatuses connected to the base station 100. In the following description, the base station 100 will be also referred to as an AP 100. The terminal apparatus 200 is a radio communication apparatus which operates as a station (hereinafter, also referred to as a station (STA)), and connects to the AP 100 to perform radio communication. In the example illustrated in FIG. 1, the terminal apparatuses 200A and 200B are smartphones, and the terminal apparatus 200C is a tablet terminal. In the following description, the terminal apparatus 200 will be also referred to as an STA 200. The AP 100 and the STA 200 can perform radio communication using an arbitrary scheme such as a space division multiplex scheme and a frequency division multiplex scheme. Note that communication from the AP 100 to the STA 200 will be also referred to as downlink (DL), and communication from the STA 200 to the AP 100 will be also referred to as uplink (UL).

For example, as illustrated in FIG. 1, the radio communication system 1 can include the AP 100 and the plurality of STAs 200A to 200C. The AP 100 and the STAs 200A to 200C are respectively connected via radio communication and directly perform transmission/reception of frames with each other. For example, the AP 100, which is a communication apparatus complying with IEEE 802.11ac, performs space-division multiple access (SDMA) using an adaptive array antenna.

Here, typically, in the case where transmission periods of frames to be transmitted by the plurality of STAs 200 are different, the number of times of multiplexing of frames during a reception period of the frames increases or decreases. Therefore, reception power of the AP 100 which receives the frames precipitously changes during the reception period, and change of the reception power can affect reception performance of the AP 100.

To address this, while a method for making transmission periods of a plurality of frames the same by adding padding to the plurality of frames having different transmission periods as appropriate has been proposed, because the padding is meaningless as data, radio resources are consumed.

Therefore, the present disclosure proposes a radio communication apparatus which can realize effective utilization of radio resources in radio communication. Specifically, an apparatus which transmits a frame adds information useful at a reception side to the frame in place of padding. Because information meaningful as data is used to make transmission periods of the frames the same, it is possible to realize effective utilization of radio resources.

Note that, while, in FIG. 1, an example where the radio communication system 1 is configured with the AP 100 and the STA 200 has been described as an example, the present technology is not limited to this example. For example, the radio communication system 1 may be a system which has a plurality of STAs 200 and has a plurality of direct links between one STA 200 and other plurality of STAs 200. In this case, the above-described DL can be read as "simultaneous transmission from one STA to a plurality of STAs" and the above-described UL can be read as "simultaneous transmission from a plurality of STAs to one STA".

Each embodiment of the present disclosure will be described in detail below.

<2. First Embodiment>

The present embodiment is an embodiment relating to MU-MIMO of the UL. In the following description, first, a configuration of the AP 100 according to the present embodiment will be described with reference to FIG. 2.

[2-1. Configuration Example of AP]

Figure 2:
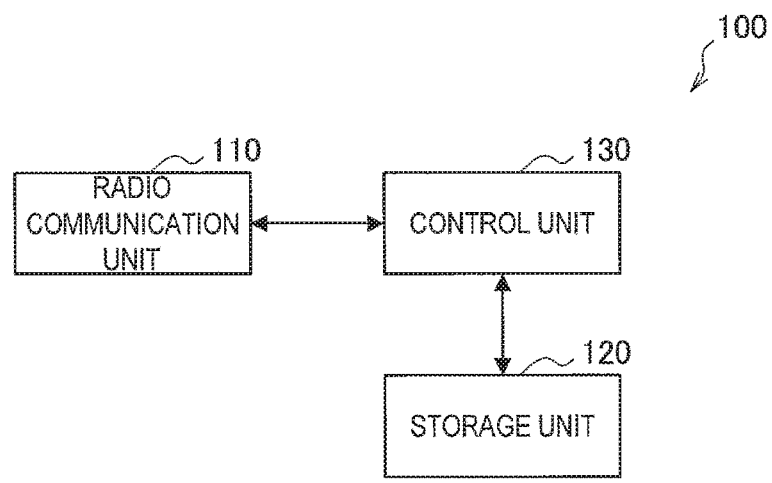
FIG. 2 is a block diagram illustrating an example of a logical configuration of an AP according to the present embodiment.

FIG. 2 is a block diagram illustrating an example of a logical configuration of the AP 100 according to the present embodiment. As illustrated in FIG. 2, the AP 100 includes a radio communication unit 110, a storage unit 120 and a control unit 130.

(1) Radio Communication Unit 110

The radio communication unit 110 is a radio communication interface which mediates radio communication with other apparatuses by the AP 100. In the present embodiment, the radio communication unit 110 performs radio communication with the STA 200. For example, the radio communication unit 110 receives a radio signal transmitted from the STA 200. The radio communication unit 110 may have a function as an amplifier, a frequency converter, a demodulator, or the like, and, for example, can output the received data to the control unit 130. Further, the radio communication unit 110 transmits a radio signal to the STA 200 via an antenna. The radio communication unit 110 may have a function as a modulator, an amplifier, or the like, and, for example, may output the data output from the control unit 130 after performing modulation, power amplification, or the like, on the data.

The radio communication unit 110 according to the present embodiment receives a transmission allowance request signal from the STA 200. Further, the radio communication unit 110 transmits a transmission allowance signal in response to the transmission allowance request signal to one or more STAs 200. Further, the radio communication unit 110 receives a frame which is spatially multiplexed and transmitted by one or more STAs 200 which are transmission destinations of the transmission allowance signal. Note that, as the transmission allowance request signal, for example, a request to send (RTS) frame or a frame obtained by expanding the RTS frame can be used. Further, as the transmission allowance signal, for example, a clear to send (CTS) frame or a frame obtained by expanding the CTS frame can be used.

(2) Storage Unit 120

The storage unit 120 is a portion which stores data and reproduces data in and from various kinds of storage media. For example, the storage unit 120 stores information received from the STA 200.

(3) Control Unit 130

The control unit 130 according to the present embodiment controls the whole operation at the AP 100.

The control unit 130 according to the present embodiment controls radio communication between the AP 100 and the STA 200. For example, in the case where a transmission allowance request signal is received from the STA 200, the control unit 130 allows the STA 200 which is a transmission source to perform transmission or allows other STAs 200 to perform transmission and causes frames to be transmitted from the plurality of STAs 200 to be spatially multiplexed. Further, the control unit 130 assigns radio resources to be used for radio communication with the STAs 200. Still further, the control unit 130 performs beamforming for the STAs 200. The control unit 130 collects information to be used for such communication by the radio communication unit 110 from the STA 200.

Typically, the AP 100 transmits information indicating information to be requested, to the STA 200, and the STA 200 returns the requested information. Note that the information collected from the STA 200 is AP utilizable information which will be described later. Information indicating the AP utilizable information requested by the AP 100 is identification information of the AP utilizable information which is included in multiplexing instruction information which will be described later.

Each function of the control unit 130 will be described below.

(a) Processing Relating to Transmission Allowance Request Signal

For example, the control unit 130 acquires information relating to a frame to be transmitted from the STA 200 from the transmission allowance request signal received by the radio communication unit 110. For example, the control unit 130 acquires at least one of a transmission period of the frame and time at which transmission of the frame is to be started.

The control unit 130 determines whether to allow the STA 200 which is a transmission source of the transmission allowance request signal to perform transmission. In the case where the control unit 130 allows transmission, the control unit 130 selects other STAs 200 which are to be allowed to perform transmission and whose frames are to be spatially multiplexed, other than the STA 200 which is the transmission source of the transmission allowance request signal. There can be various selection methods. For example, the control unit 130 may randomly select other STAs 200 from the STAs 200 connected to the AP 100 itself. Other than this method, in the case where the storage unit 120 stores past channel gains between the AP 100 and the respective STAs 200, the control unit 130 may select an STA 200 having a channel gain with low correlation with a channel gain of the STA 200 which is the transmission source of the transmission allowance request signal.

Further, the control unit 130 assigns radio resources to the STAs 200 which are allowed to perform transmission. The control unit 130 can assign radio resources of at least one of a time domain and a frequency domain. In the present embodiment, it is assumed that the control unit 130 assigns radio resources of the time domain. The control unit 130 makes the length of the time domain of the radio resources to be assigned the same among a plurality of STAs 200 which are allowed to perform transmission. By this means, the length of the time domain of radio resources to be assigned to one STA 200 becomes the same as the length of the time domain of other radio resources to be assigned for other frames to be spatially multiplexed with the frame to be transmitted from the STA 200. For example, the control unit 130 assigns the same transmission period as transmission periods during which transmission is allowed for respective STAs 200. The control unit 130 can assign a transmission period during which transmission is allowed on the basis of, for example, information included in the transmission allowance request signal.

The control unit 130 can store information indicating the STA 200 which is allowed to perform transmission and information indicating a period during which transmission is allowed in multiplexing instruction information which will be described later.

(b) Processing Relating to Transmission Allowance Signal

For example, the control unit 130 controls the radio communication unit 110 to transmit the transmission allowance signal to the STA 200 which is allowed to perform transmission. In this event, the control unit 130 controls the radio communication unit 210 to transmit the transmission allowance signal to other STAs 200 whose frames are to be multiplexed with the frame of the STA 200 as well as to the STA 200 which is the transmission source of the transmission allowance request signal.

Here, the control unit 130 stores information to be used for multiplexing of the frames by the STA 200 in the transmission allowance signal. The STA 200 multiplexes frames in accordance with this information. In the following description, this information will be also referred to as multiplexing instruction information.

For example, the multiplexing instruction information includes identification information of the STAs 200 whose frames can be spatially multiplexed. Specifically, the multiplexing instruction information may include identification information of other STAs 200 whose frames can be spatially multiplexed with the frame of the STA 200 which is the transmission source of the transmission allowance request signal. Further, the multiplexing instruction information may include identification information of the STA 200 itself which is the transmission source of the transmission allowance request signal. Still further, the multiplexing instruction information may respectively include identification information of the respective STAs 200. In this case, the identification information is, for example, a MAC address. Other than the above-described information, the multiplexing identification information may include identification information indicating a group formed with a plurality of STAs 200 whose frames are to be multiplexed. In this case, the identification information is, for example, a multicast address. With this information, the STA 200 which is not the transmission source of the transmission allowance request signal can know that the STA 200 can perform transmission.

Other than the above-described information, the multiplexing instruction information can include various kinds of information as described below. Note that, in the case where the following information is not included in the multiplexing instruction information, the STA 200 may use known information fixed within the radio communication system 1.

For example, the multiplexing instruction information can include information indicating radio resources to be utilized by the STA 200 for transmission of a frame. For example, the multiplexing instruction information can include information indicating time at which transmission of the frame is to be started by the STA 200 which is the transmission source of the transmission allowance request signal. Further, the multiplexing instruction information can include information indicating a transmission period during which the AP 100 allows transmission. The transmission period during which the AP 100 allows transmission may be the same as the transmission period of the frame to be transmitted by the STA 200 which is the transmission source of the transmission allowance request signal, may be a value uniquely calculated from the transmission period of the frame or may be a default value.

Further, the multiplexing instruction information can include information relating to a training signal to be used by the AP 100 to separate channel gains with the respective STAs 200. The information relating to the training signal may be, for example, index information of a training signal to be used by each STA 200 whose frame is to be multiplexed among a plurality of training signals with low correlation prepared in advance. Other than the above-described information, the information relating to the training signal may be information indicating a timing at which the training signal is to be transmitted to each STA 200.

Further, the multiplexing instruction information can include identification information indicating one of information which can be utilized by the AP 100. By this means, AP 100 can request the STA 200 to transmit information indicated in this identification information. Note that the information which can be utilized by the AP 100 will be, hereinafter, also referred to as AP utilizable information.

For example, the AP utilizable information may be channel information at the STA 200. Specifically, the AP utilizable information may be a channel state information (CSI) frame defined in IEEE 802.11. The CSI frame is a frame in which information used when a radio communication apparatus (beam former) which performs beamforming performs beamforming on a radio communication apparatus (beam formee) which receives a radio signal subjected to beamforming is described. Note that, in the present embodiment, the AP 100 is the beam former. For example, the CSI frame is used by the beam formee to transmit channel information of the beam formee to the beam former. Further, the CSI frame is useful for link adaptation, resource allocation in the case where OFDMA is performed and grouping of the STAs 200 in the case where beamforming is performed, as well as useful for beam forming. The AP 100 may perform single user beamforming (SU-BF) in which transmission to a specific one STA 200 is performed or may perform multi user beamforming (MU-BF) in which transmission to a plurality of STAs 200 is performed.

For example, the AP utilizable information may be a coefficient to be used for beamforming. Specifically, the AP utilizable information may be a noncompressed beamforming frame defined in IEEE 802.11. The noncompressed beamforming frame is a frame used by the beam formee to transmit a beamforming feedback matrix to the beam former.

For example, the AP utilizable information may be information in which a coefficient to be used for beamforming is compressed. Specifically, the AP utilizable information may be a compressed beamforming frame defined in IEEE 802.11. The compressed beamforming frame is a frame to be used by the beam formee to transmit a beamforming feedback matrix compressed using angular information to the beam former.

For example, the AP utilizable information may be information measured at the STA 200. Specifically, the AP utilizable information may be a measurement report frame defined in IEEE 802.11 or a radio measurement report frame. The measurement report frame and the radio measurement report frame are frames to be used to transmit information relating to a frame received by the STA 200 and information indicating a communication environment such as channel occupancy and noise histogram.

Note that the AP utilizable information may include at least one of the CSI frame, the noncompressed beamforming frame, the compressed beamforming frame, the measurement report frame and the radio measurement report frame.

The AP utilizable information has been described above. Description will return to description regarding the multiplexing instruction information below.

The multiplexing instruction information can include information indicating a rule of processing of adding the AP utilizable information to a frame at the STA 200. The STA 200 hierarchizes the AP utilizable information in accordance with this information and adds the hierarchized AP utilizable information to a frame to be transmitted. In the following description, this information indicating the rule will be also referred to as hierarchization instruction information. The hierarchization instruction information can include, for example, at least one of the number of groups into which the information is to be divided, identification information indicating a division method and information indicating an index of a group which requests transmission. Other than the above-described information, the hierarchization instruction information may include information giving an instruction to add difference information indicating a difference with the collected AP utilizable information to the frame.

Here, hierarchization indicates dividing information and determining priority of the divided information. The STA 200 divides an AP utilizable method into the number of groups designated in the hierarchization instruction information using the division method designated in the hierarchization instruction information. The STA 200 then adds information of a group designated in the hierarchization instruction information to the frame to be transmitted in accordance with the priority. Because a specific example of hierarchization based on the hierarchization instruction information will be specifically described in description relating to the STA 200, detailed description will be omitted here.

Note that there is a case where the sizes of the measurement report frame and the radio measurement report frame are smaller than the size of other AP utilizable information. Therefore, for the measurement report frame and the radio measurement report frame, information indicating an instruction not to perform hierarchization may be included in the hierarchization instruction information.

Further, while, in the present embodiment, the hierarchization instruction information is included in the transmission allowance signal, the present technology is not limited to this example. For example, the hierarchization instruction information may be transmitted when a sounding protocol is implemented, or may be transmitted using other known means.

The multiplexing instruction information has been described above.

The control unit 130 stores this multiplexing instruction information in the CTS frame or a frame obtained by expanding the CTS frame. In this event, the control unit 130 stores the multiplexing instruction information in at least one of a header of the frame and a predetermined field within a frame body.

In this manner, by the AP 100 transmitting the transmission allowance signal including the multiplexing instruction information to a plurality of STAs 200 including the STA 200 which is the transmission source of the transmission allowance request signal, the plurality of STAs 200 can transmit frames while performing spatial multiplexing.

(c) Processing Relating to Collected AP Utilizable Information

The control unit 130 acquires AP utilizable information which is added within such a range that transmission can be performed using the radio resources assigned to the STA 200 and which can be used for communication by the radio communication unit 110, from the frame received by the radio communication unit 110. The control unit 130 then controls processing of the radio communication unit 110 using the AP utilizable information. For example, the control unit 130 performs multiuser beamforming, single user beamforming, resource allocation in OFDMA, link adaptation, or the like, using the CSI frame, or the like, collected from the STA 200.

Here, there can be a case where part of the hierarchized AP utilizable information has been received, while the other part of the hierarchized AP utilizable information has not been received yet. In this case, the control unit 130 may estimate information which has not been received yet using the received information among the AP utilizable information. For example, the control unit 130 interpolates the AP utilizable information which has not been received yet by performing estimation based on the received AP utilizable information. Note that the control unit 130 may perform linear interpolation or may perform interpolation using a fixed value. In the case where, for example, channel information (such as a CSI frame) of part of subcarriers has been received, the control unit 130 can perform beamforming by interpolating channel information of the other subcarriers. Further, the control unit 130 may update the interpolated AP utilizable information every time the hierarchized AP utilizable information is newly received. For example, the control unit 130 replaces the interpolated AP utilizable information with newly received AP utilizable information or performs linear interpolation on the basis of the newly received utilizable information. Through such interpolation processing and updating processing, the control unit 130 can perform beamforming even when part of the AP utilizable information has not been received yet. Further, the control unit 130 can gradually improve performance of beamforming as new AP utilizable information is received.

The configuration example of the AP 100 has been described above. Subsequently, the configuration example of the STA 200 will be described with reference to FIG. 3 to FIG. 5.

[2-2. Configuration Example of STA]

Figure 3:
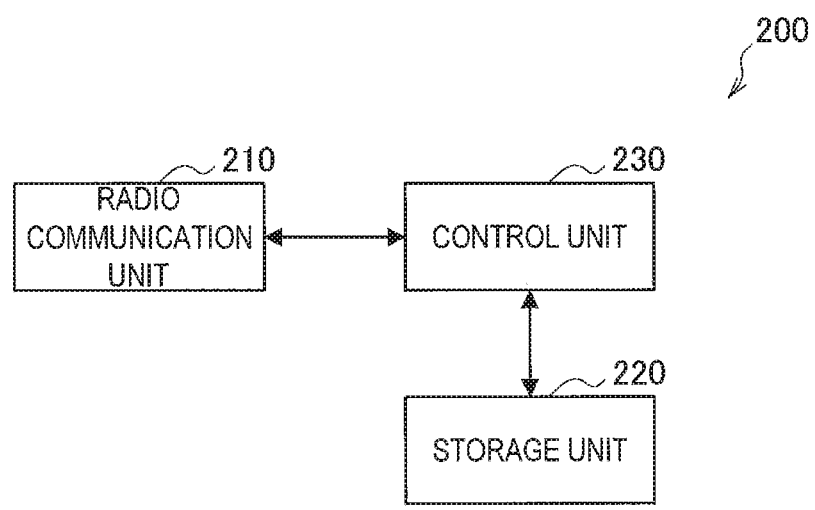
FIG. 3 is a block diagram illustrating an example of a logical configuration of an STA according to the present embodiment.

FIG. 3 is a block diagram illustrating an example of a logical configuration of the STA 200 according to the present embodiment. As illustrated in FIG. 3, the STA 200 includes a radio communication unit 210, a storage unit 220 and a control unit 230.

(1) Radio Communication Unit 210

The radio communication unit 210 is a radio communication interface which mediates radio communication with other apparatuses by the STA 200. In the present embodiment, the radio communication unit 210 performs radio communication with the AP 100. For example, the radio communication unit 210 receives a radio signal transmitted from the AP 100. The radio communication unit 210 may have a function as an amplifier, a frequency converter, a demodulator, or the like, and, for example, can output the received data to the control unit 230. Further, the radio communication unit 210 transmits a radio signal to the AP 100 via an antenna. The radio communication unit 210 may have a function as a modulator, an amplifier, or the like, and, for example, may output data output from the control unit 230 after performing modulation, power amplification, or the like, on the data.

The radio communication unit 210 according to the present embodiment transmits a transmission allowance request signal to the AP 100. Further, the radio communication unit 210 receives a transmission allowance signal from the AP 100. Still further, the radio communication unit 210 transmits a frame in which at least one of data and the AP utilizable information is stored.

(2) Storage Unit 220

The storage unit 220 is a portion which stores and reproduces data in and from various kinds of storage media. For example, the storage unit 220 stores information received from the AP 100.

(3) Control Unit 230

The control unit 230 according to the present embodiment controls the whole operation at the STA 200.

For example, the control unit 230 controls the radio communication unit 210 to transmit a frame to the AP 100. In this event, the control unit 230 controls processing of making transmission periods of the frames the same. Specifically, the control unit 230 controls processing of adding information (AP utilizable information) which can be used for communication by the AP 100 which is the transmission destination to a frame within such a range that transmission can be performed using the assigned radio resources. By this means, because the control unit 230 can add the AP utilizable information which is meaningful as data to the frame, it is possible to realize effective utilization of the radio resources. Here, the length of the time domain of the radio resources assigned to the STA 200 itself is the same as the length of the time domain of other radio resources assigned for other frames to be transmitted from other STAs 200. Therefore, because the control unit 230 can make the transmission periods the same between the frame to be transmitted and one or more other frames to be spatially multiplexed, it is possible to avoid precipitous change of reception power at the AP 100.

Each function of the control unit 230 will be described below.

(a) Processing Relating to Transmission Allowance Request Signal

For example, the control unit 230 controls the radio communication unit 210 to transmit a transmission allowance request signal to the AP 100 in the case where a request for transmitting a frame is made. In this event, the control unit 230 stores information relating to the frame to be transmitted in the transmission allowance request signal. For example, the control unit 230 stores at least one of a transmission period of the frame to be transmitted and time at which transmission of the frame is to be started in the transmission allowance request signal.

(b) Processing of Adding AP Utilizable Information to Frame (b-1) Outline

The control unit 230 acquires multiplexing instruction information from the transmission allowance signal and multiplexes a frame to be transmitted in accordance with the multiplexing instruction information. For example, the control unit 230 controls the radio communication unit 210 to transmit the frame using radio resources indicated in the multiplexing instruction information. In the present embodiment, the control unit 230 controls the radio communication unit 210 to transmit the frame using a transmission period (assigned radio resources) designated in the multiplexing instruction information without excessively or deficiently using the transmission period.

In order to use the transmission period designated in the multiplexing instruction information without excessively or deficiently using the transmission period, the control unit 230 performs processing of making a transmission period of the frame the same as the transmission period designated in the multiplexing instruction information. In the case where the STA 200 is the transmission source of the transmission allowance request signal, the control unit 230 adds data relating to the transmission allowance request signal to the frame and, if there is free area, adds the AP utilizable information requested in the multiplexing instruction information. On the other hand, there can be a case where the STA 200 is not the transmission source of the transmission allowance request signal. In this case, in the case where there exists data which can be transmitted, the control unit 230 adds the data and the AP utilizable information to the frame, while, in the case where there is no data which can be transmitted, the control unit 230 adds the AP utilizable information to the frame.

In order to use the transmission period designated in the multiplexing instruction information without excessively or deficiently using the transmission period, the control unit 230 may hierarchize the AP utilizable information and add the hierarchized AP utilizable information to one or more frames. There is a case where, after a frame to which part of hierarchized AP utilizable information is added is transmitted, the transmission allowance signal is received again. In this case, the control unit 230 adds part of the hierarchized AP utilizable information which has not been transmitted yet to one or more frames. In this manner, by the STA 200 performing hierarchization, it is possible to transmit the AP utilizable information even in the case where there is no large free area. Further, the AP 100 can utilize part of the AP utilizable information before the whole AP utilizable information is received. Still further, by the STA 100 gradually transmitting the hierarchized AP utilizable information, the AP 100 can perform communication while gradually improving accuracy of the AP utilizable information.

The control unit 230 may control processing of adding the AP utilizable information to the frame in accordance with a rule (hierarchization instruction information) stored in the transmission allowance signal. In this case, the control unit 230 divides the AP utilizable information requested in the multiplexing instruction information into the number of groups designated in the hierarchization instruction information using a division method designated in the hierarchization instruction information and adds information of the group designated in the hierarchization instruction information to the frame. In the case where the control unit 230 performs hierarchization in accordance with the hierarchization instruction information from the AP 100, the AP 100 can collect the information requested by the AP 100 in the order the information is requested.

Note that there is also a case where the transmission allowance signal does not include information indicating AP utilizable information requested by the AP 100. In this case, the control unit 230 voluntarily selects AP utilizable information to be transmitted. The same will also apply to the hierarchization instruction information, or the like.

In order to use the transmission period designated in the multiplexing instruction information without excessively or deficiently using the transmission period, the control unit 230 may perform padding processing of adding pad bits to the frame to which the hierarchized AP utilizable information is added.

Note that, concerning division of data, IEEE 802.11 defines a mechanism called fragment. On the other hand, there is a field called Remaining Matrix Segment in a MIMO Control field of the CSI frame, the noncompressed beamforming frame, and the compressed beam forming frame. Therefore, the STA 200 can perform transmission without performing fragment when hierarchizing these information and transmitting the hierarchized information.

(b-2) Frame Configuration

Here, a frame configuration of a frame to which AP utilizable information is added will be described with reference to FIG. 4.

Figure 4:
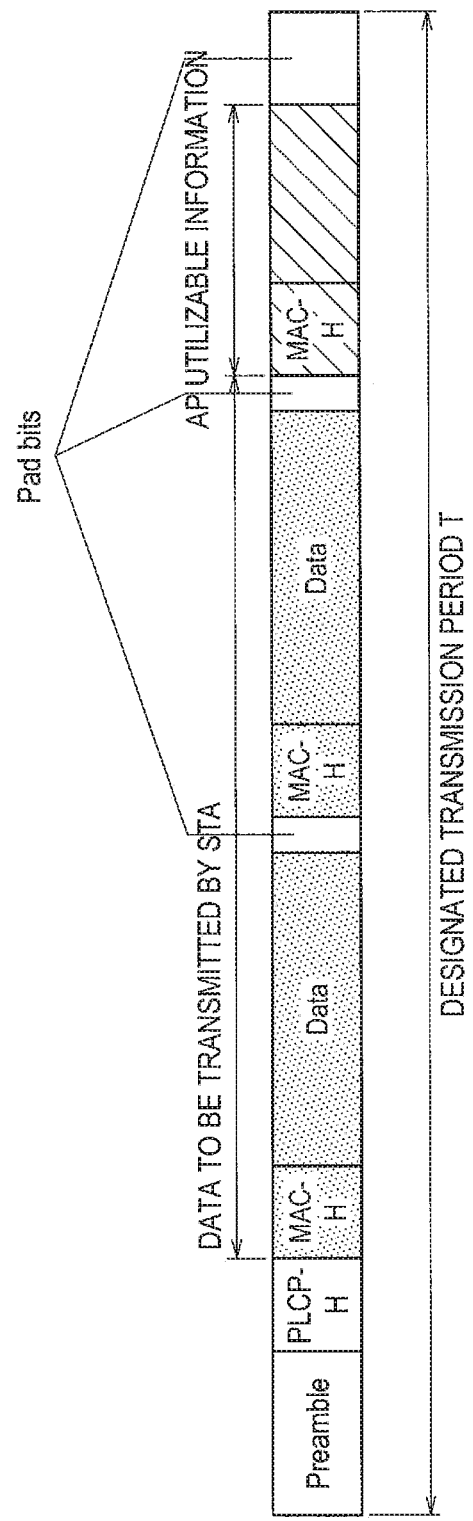
FIG. 4 is a diagram illustrating an example of a frame to be transmitted by the STA according to the present embodiment.

FIG. 4 is a diagram illustrating an example of a frame to be transmitted by the STA 200 according to the present embodiment. As illustrated in FIG. 4, the frame includes a preamble, a PLCP header (PLCP-H), a MAC header (MAC-H), data and pad bits. The preamble can be used for synchronization of frames, correction of a frequency offset, channel estimation, or the like. The PLCP header is a frame in which a modulation scheme, a period of a frame, or the like, are stored. The MAC header is a field in which the type of a frame, a transmission destination address, a transmission source address, or the like, are stored.

As illustrated in FIG. 4, the AP utilizable information is added within such a range that the transmission period of the frame does not exceed a transmission period T designated in the multiplexing instruction information. The AP utilizable information may be added after a subframe in which data to be transmitted by the STA 200 is stored. Further, after the AP utilizable information, pad bits for making the transmission period of the frame the same as the transmission period T designated in the multiplexing instruction information may be added.

As in the example illustrated in FIG. 4, the frame to be transmitted by the STA 200 may be an aggregation frame. In the case of the aggregation frame, padding can be implemented within each subframe in accordance with the specifications of IEEE 802.11. It is also possible to insert the AP utilizable information in place of pad bits within the subframe.

Further, in the case where CTS and RTS are transmitted/received prior to transmission/reception of data as in the present embodiment, there is a case where synchronization has been already established between transmission and reception. Therefore, in the case where a transmission opportunity is obtained, and a transmission timing is known, the preamble may be omitted.

(b-3) Hierarchization Method

There can be various hierarchization methods. Specific examples of the hierarchization method will be described below.

Hierarchization in Accordance with Index of Subcarrier

The control unit 230 may hierarchize channel information of a plurality of subcarriers in accordance with indexes of the subcarriers. In this case, assuming that the number of subcarriers is N and the number of groups is K, the control unit 230 can perform hierarchization in accordance with a value of Mod [N, K]. This specific example in the case where N=56 and K=4 will be described below with reference to FIG. 5.

Figure 5:
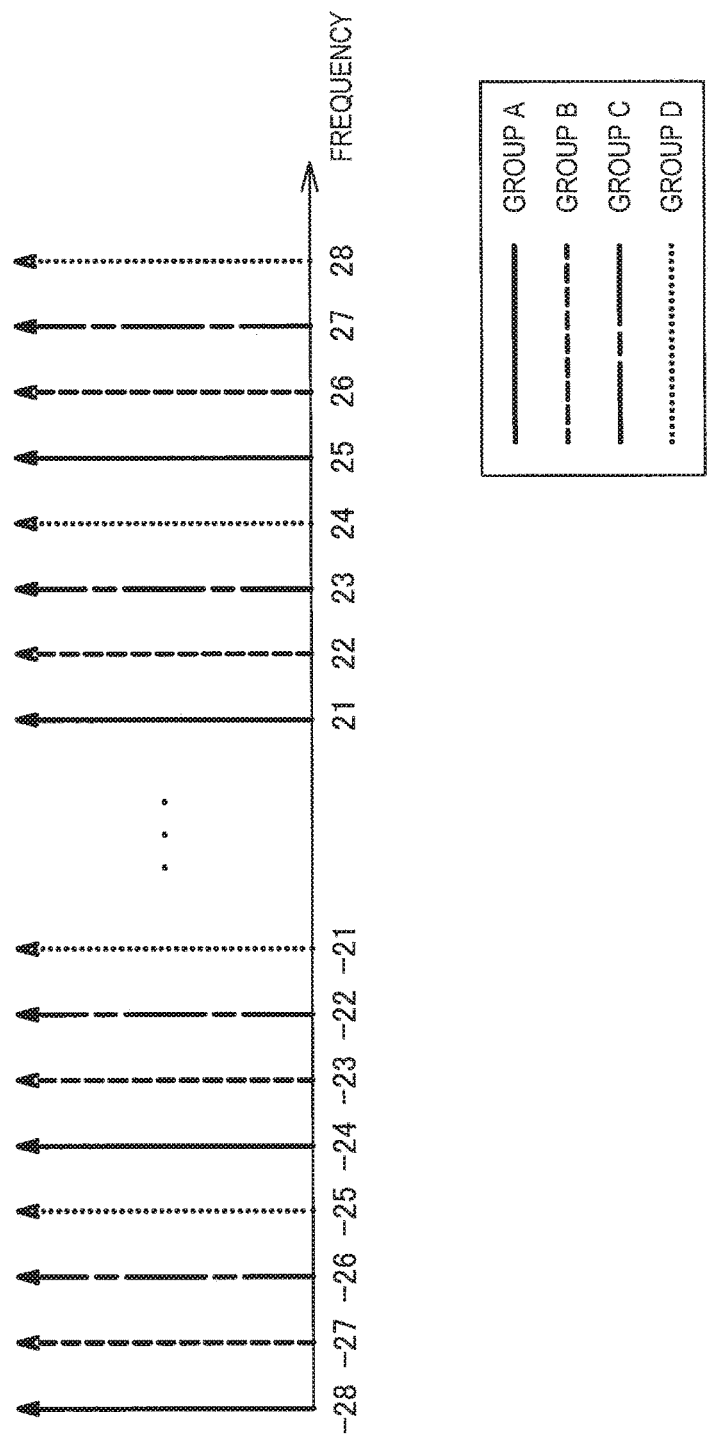
FIG. 5 is a diagram for explaining an example of hierarchization processing of AP utilizable information according to the present embodiment.

FIG. 5 is a diagram for explaining an example of hierarchization processing of the AP utilizable information according to the present embodiment. As illustrated in FIG. 5, in IEEE 802.11, upon communication using a 20 MHz band, there are 56 subcarriers which can be used for transmission of signals. The CSI frame includes channel information of the respective subcarriers. Here, an example is assumed where these subcarriers are divided into four groups. Assuming that subcarrier number is k, a group of k=−28, −24, . . . , 21, 25 is set as group A, a group of k=−27, −23, . . . , 22, 26 is set as group B, a group of k=−26, −22, . . . , 23, 27 is set as group C, and a group of k=−25, −21, . . . , 24, 28 is set as group D.

For example, an example is assumed where, in the hierarchization instruction information included in the transmission allowance signal transmitted from the AP 100 to the STA 200, the AP 100 requests the STA 200 to transmit channel information of group C. In this case, the hierarchization instruction information indicates that the number of groups into which the information is to be divided is four, identification information indicating a division method is a method using indexes of the subcarriers, and the index of the group which is to be used for transmission is group C. The control unit 230 adds the CSI frame relating to group C to the frame to be transmitted in accordance with this information.

Here, as described above, the AP 100 can perform interpolation processing relating to the AP utilizable information which has not been received yet. For example, in the case where the STA 200 has transmitted the channel information relating to group C, the AP 100 performs linear interpolation on channel information relating to groups A, B and D which has not been received yet on the basis of the channel information relating to group C which has been received.

Therefore, the AP 100 can perform beamforming to the STA 200 at a time point at which the channel information of the subcarriers of group C is received.

Further, the control unit 230 can add the channel information relating to the remaining group A, B or D to the frame after adding the channel information relating to group C. In this event, the control unit 230 may cause channel information relating to a group to be transmitted so that average density of the channel can be maintained at a constant level. Specifically, the control unit 230 may add the hierarchized channel information to the frame in such order that indexes of the subcarriers included in the channel information are separated. For example, the control unit 230 may add the channel information relating to group A to a frame to which the channel information relating to group C is added or a frame to be transmitted after the frame after adding the channel information relating to group C. For example, in the example illustrated in FIG. 5, the control unit 230 adds the channel information relating to group A after the channel information relating to group C. In this case, because resolution of the channel is homogeneously improved, it is possible to improve property of beamforming by the AP 100.

Note that, while an example has been described above where the number of groups is an even number of four, the number of groups may be an odd number. For example, in the case where the number of groups is five, the control unit 230 divides the channel information into group A, group B, group C, group D and group E. If the control unit 230 adds channel information relating to group A to a frame first, a group most separated from group A is either group C or group D. In such a case, the control unit 230 may select group C or may select group D as a group which is to be added to the frame next to group A.

Hierarchization in Accordance with Amplitude of Channel

The control unit 230 may hierarchize channel information of a plurality of subcarriers in accordance with an amplitude of the channel. For example, assuming that $C_{max}$ is a maximum value of the amplitude of the channel, $C_{min}$ is a minimum value of the amplitude of the channel, and the number of groups is K, the control unit 230 may perform hierarchization in accordance with a value of $(C-C_{min})/((C_{max}-C_{min})/K)+1$. An example of grouping in the case where K=4 will be described below. For example, the control unit 230 sets subcarriers whose amplitude C of the channel is $C_{min} \leq C < C_{min}(C_{max}-C_{min})/4$ as group A. Further, the control unit 230 sets subcarriers whose amplitude C of the channel is $C_{min}+(C_{max}-C_{min})/4 \leq C < C_{min}+2\times(C_{max}-C_{min})/4$ as group B. Still further, the control unit 230 sets subcarriers whose amplitude C of the channel is $C_{min}+2\times(C_{max}-C_{min})/4 \leq C < C_{min}+3\times(C_{max}-C_{min})/4$ as group C. Further, the control unit 230 sets subcarriers whose amplitude C of the channel is $C_{min}+3\times(C_{max}-C_{min})/4 \leq C \leq C_{max}$ as group D. The control unit 230 may add the grouped channel information to the frame in descending order of the amplitude of the group.

Hierarchization in Accordance with Phase Rotation Amount of Channel

The control unit 230 may hierarchize channel information of a plurality of subcarriers in accordance with a phase rotation amount of a channel. For example, assuming that the phase rotation amount of the channel is $\Phi$, and the number of groups is K, the control unit 230 may group the channel information in accordance with a value of $\Phi/(2\pi/K)+1$. The control unit 230 may then add the grouped channel information to the frame in descending order of the phase rotation amount of the group.

Hierarchization in Accordance with Bit Position

The control unit 230 may hierarchize each of channel information of a plurality of subcarriers in accordance with a bit position. It is assumed that the number of bits of a bit sequence indicating one piece of channel information is Nb, the n-th bit (n=0, 1, . . . , Nb−1) is B, and the number of groups is K. For example, the control unit 230 may perform grouping in accordance with a value of B/(Nb/K)+1. For example, when K=2, the channel information can be divided into Nb/2 bits from the most significant bit (MSB) side and Nb/2 bits from the least significant bit (LSB) side. The control unit 230 may then add part of grouped information among each channel information to the frame in the order from groups including information of higher-order bits. By this means, the AP 100 can preferentially collect higher-order bits of channel information of each subcarrier, so that the AP 100 can recognize a rough amplitude of each channel information. By this means, the AP 100 can perform effective beamforming with little information.

Note that the control unit 230 may make an information amount (such as, for example, the number of subcarriers included in each group and a bit width) uniform or variable for each group.

Further, the control unit 230 may add difference information indicating a difference with information which has been transmitted among the hierarchized information to the frame. For example, the hierarchization instruction information can include identification information for requesting the difference information and an index (for example, an index indicating group A) of a group to be used as reference. In this case, the control unit 230 adds information indicating a difference between the AP utilizable information relating to group A and the AP utilizable information relating to group C to the frame to be transmitted. By this means, an information amount to be transmitted by the AP 100 to the STA 200 is reduced.

The specific examples of the hierarchization method has been described above.

(b-4) Notification of Information Relating to Hierarchization

The STA 200 may notify the AP 100 of information relating to hierarchization. The information relating to hierarchization can be identification information indicating whether processing of making transmission periods of the frames the same is performed, identification information indicating whether the AP utilizable information is included, identification information indicating whether hierarchization is performed, the number of groups the information is divided into, identification information indicating the division method, an index of a group added to the frame, identification information indicating whether the information is difference information, an index of a group used as reference of difference information, or the like. The control unit 230 can store at least one of these information in at least one of a header of the frame to be transmitted and a predetermined field within a frame body as the information relating to hierarchization. By this means, the AP 100 side can appropriately deal with the received information as the AP utilizable information. Note that the control unit 230 may store the information relating to hierarchization in the same frame as the frame to which the AP utilizable information is added or in a different frame.

(b-5) Transmission of Training Signal

The control unit 230 may control the radio communication unit 210 to transmit a training signal with setting designated in the multiplexing instruction information. For example, the control unit 230 controls the radio communication unit 210 to transmit the training signal indicated in the identification information designated in the multiplexing instruction information at a timing designated in the multiplexing instruction information.

The configuration example of the STA 200 has been described above. Subsequently, an operation processing example of the radio communication system 1 will be described with reference to FIG. 6 to FIG. 10.

[2-3. Operation Processing Example]

(Perspective)

Figure 6:
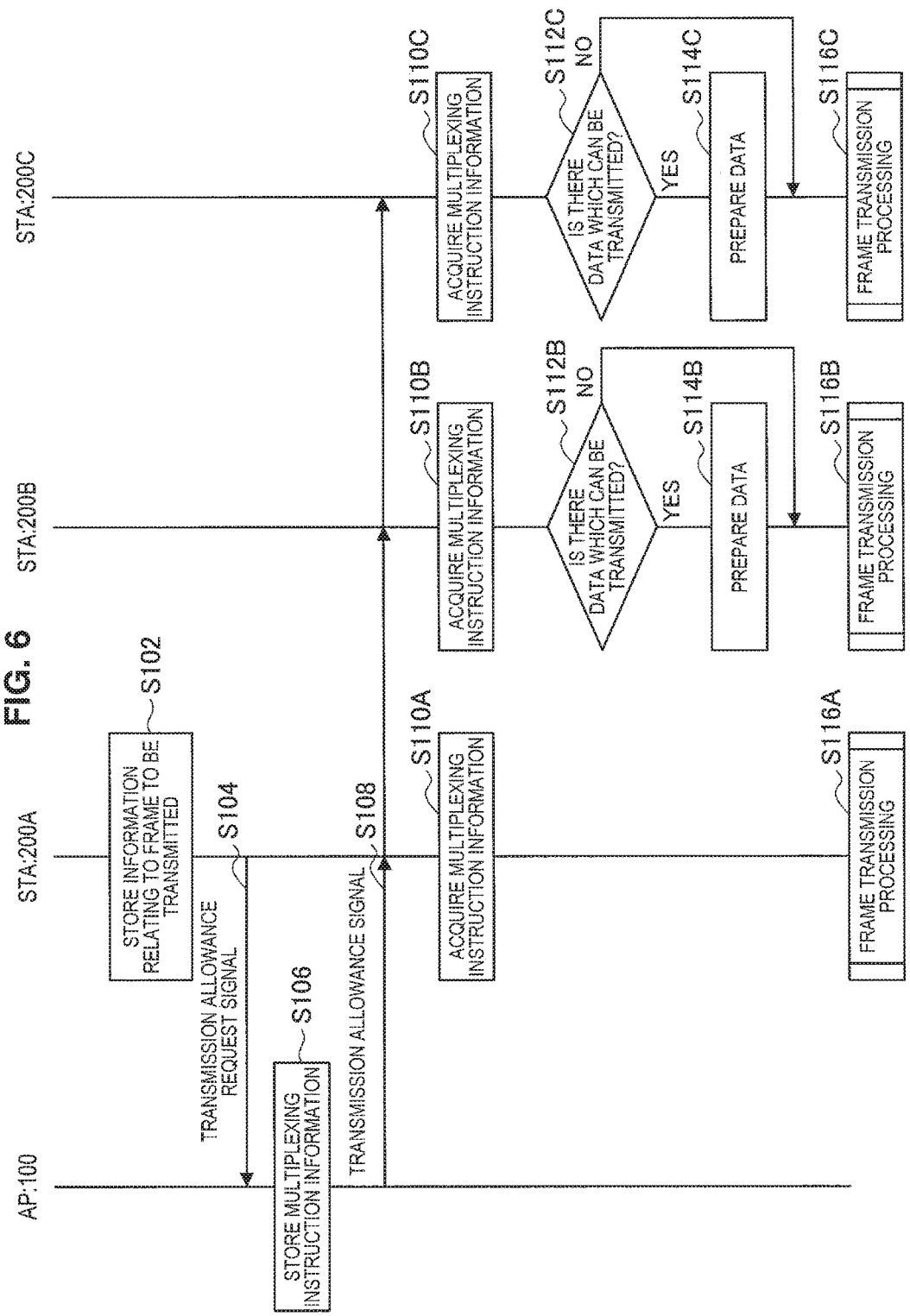
FIG. 6 is a sequence diagram illustrating an example of flow of communication processing to be executed in the radio communication system according to the present embodiment.

FIG. 6 is a sequence diagram illustrating an example of flow of communication processing to be executed in the radio communication system 1 according to the present embodiment. As illustrated in FIG. 6, this sequence involves the AP 100, the STA 200A, the STA 200B and the STA 200C.

First, in step S102, the STA 200A stores information relating to the frame to be transmitted in the transmission allowance request signal.

Then, in step S104, the STA 200A transmits the transmission allowance request signal to the AP 100.

Then, in step S106, the AP 100 stores the multiplexing instruction information in the transmission allowance signal.

Then, in step S108, the AP 100 transmits the transmission allowance signal. In this event, the AP 100 transmits the transmission allowance signal not only to the STA 200A which is the transmission source of the transmission allowance request signal, but also to the STAs 200B and 200C whose frames are to be spatially multiplexed with the frame of the STA 200A.

Then, in step S110A, S110B and S110C, each STA 200 acquires the multiplexing instruction information from the transmission allowance signal.

The STA 200A which is the transmission source of the transmission allowance signal then proceeds to frame transmission processing in step S116A. Because detailed content of this processing will be described later, detailed description will be omitted here.

On the other hand, the STAs 200B and 200C which are not the transmission source of the transmission allowance request signal determine whether there exists data which can be transmitted in step S112B and 112C.

In the case where it is determined that there exists data which can be transmitted (S112B/Yes, S112C/Yes), the STAs 200B and 200C prepare the data which can be transmitted as data to be added to the frame in step S114B and S114C. By this means, in the frame transmission processing which will be described later, in addition to the data, the AP utilizable information is stored in the frame.

On the other hand, in the case where it is determined that data which can be transmitted does not exist (S112B/No, S112C/No), the processing proceeds as is to the frame transmission processing which will be described later. In this case, in the frame transmission processing, the AP utilizable information is stored in the frame.

Subsequently, in step S116B and S116C, the STAs 200B and 200C perform frame transmission processing.

The perspective of the communication processing has been described above. Subsequently, an example of the frame transmission processing in the above-described step S116 will be described with reference to FIG. 7.

(Frame Transmission Processing)

Figure 7:
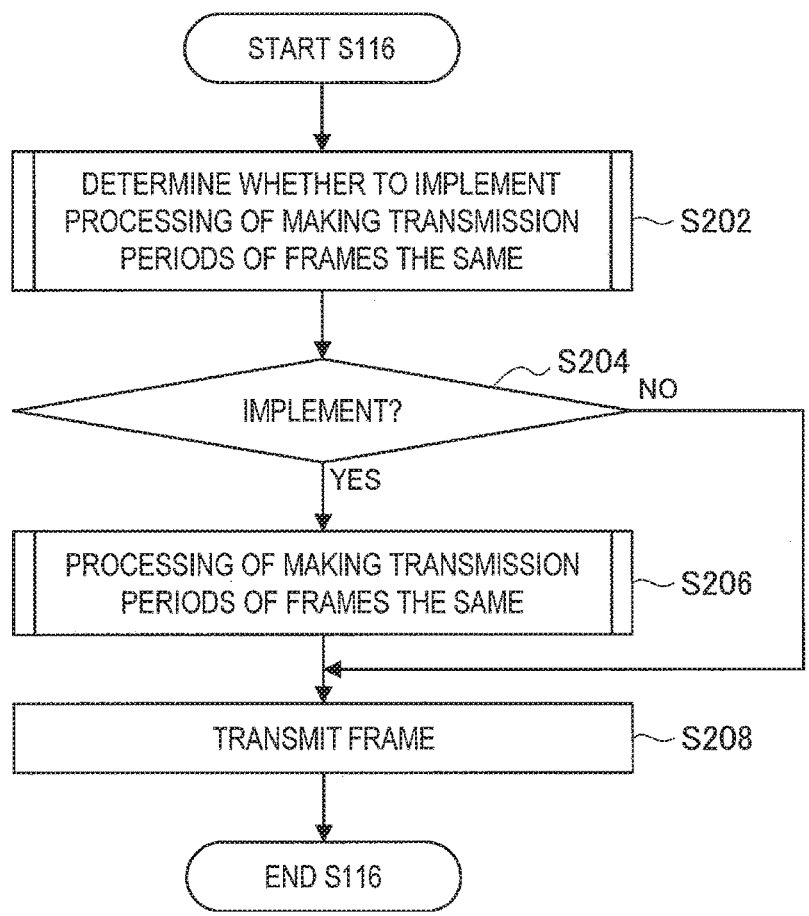
FIG. 7 is a flowchart illustrating an example of flow of frame transmission processing to be executed at the STA according to the present embodiment.

FIG. 7 is a flowchart illustrating an example of flow of the frame transmission processing to be executed in the STA 200 according to the present embodiment.

As illustrated in FIG. 7, first, in step S202, the control unit 230 performs processing of determining whether to implement processing of making transmission periods of frames the same. Because detailed content of this processing will be described later, detailed description will be omitted here.

In the case where it is determined to implement the processing (S204/Yes), in step S206, the control unit 230 performs processing of making transmission periods of frames the same. Because detailed content of this processing will be described later, detailed description will be omitted here. Then, in step S208, the control unit 230 controls the radio communication unit 210 to transmit a frame subjected to the processing of making transmission periods of frames the same.

On the other hand, in the case where it is determined not to implement the processing (S204/No), in step S208, the control unit 230 controls the radio communication unit 210 to transmit a frame which is not subjected to processing of making transmission periods of frames the same.

The frame transmission processing has been described above. Subsequently, an example of processing of determining whether to implement processing of making transmission periods of frames the same in the above-described step S202 will be described with reference to FIG. 8.

(Processing of Determining Whether to Implement Processing of Making Transmission Periods of Frames the Same)

Figure 8:
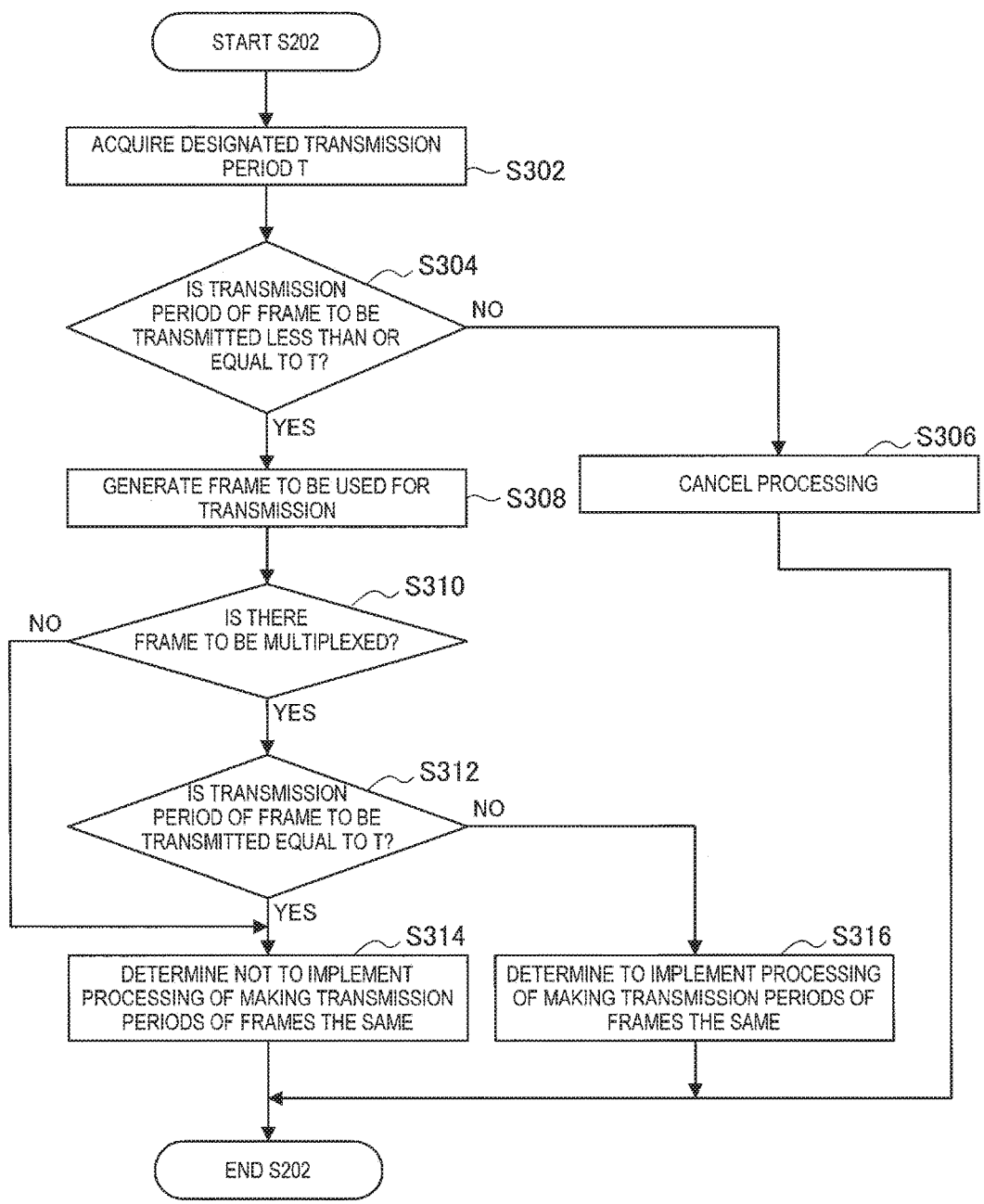
FIG. 8 is a flowchart illustrating an example of flow of processing of determining whether to implement processing of making transmission periods of frames the same, to be executed at the STA according to the present embodiment.

FIG. 8 is a flowchart illustrating an example of flow of processing of determining whether to implement processing of making transmission periods of frames the same, to be executed at the STA 200 according to the present embodiment.

As illustrated in FIG. 8, first, in step S302, the control unit 230 acquires the designated transmission period T. For example, the control unit 230 may acquire the transmission period T from the multiplexing instruction information or may calculate the transmission period T from information included in the multiplexing instruction information. Note that this transmission period T is common among the STAs 200 whose frames are to be spatially multiplexed.

Then, in step S304, the control unit 230 determines whether a transmission period $t_{frame}$ of the frame to be transmitted is less than or equal to the designated transmission period T. The transmission period $t_{frame}$ of the frame to be transmitted is a transmission period of a frame in which data to be transmitted by the STA 200 is stored.

In the case where it is determined that the transmission period $t_{frame}$ of the frame to be transmitted exceeds the designated transmission period T (S304/No), in step S306, the control unit 230 cancels the processing.

On the other hand, in the case where it is determined that the transmission period $t_{frame}$ of the frame to be transmitted is less than or equal to the designated transmission period T (S304/Yes), in step S308, the control unit 230 generates a frame to be used for transmission.

Then, in step S310, the control unit 230 determines whether there exists a frame to be multiplexed with the frame to be transmitted. For example, the control unit 230 performs this determination in accordance with whether the multiplexing instruction information includes identification information of terminals other than the own terminal as identification information of the STAs 200 whose frames can be spatially multiplexed.

In the case where it is determined that there exists a frame to be multiplexed (S310/Yes), in step S312, it is determined whether the transmission period $t_{frame}$ of the frame to be transmitted is equal to the designated transmission period T.

In the case where the transmission period $t_{frame}$ is equal to the designated transmission period T (S312/Yes), in step S314, the control unit 230 determines not to implement processing of making transmission periods of frames the same. In the above-described step S310, in the case where it is determined that a frame to be multiplexed does not exist (S310/No), in step S314, the control unit 230 determines not to implement processing of making transmission periods of frames the same.

On the other hand, in the case where it is determined that the transmission period $t_{frame}$ is not equal to the designated transmission period T (S312/No), in step S316, the control unit 230 determines to implement processing of making transmission periods of frames the same.

The processing of determining whether to implement processing of making transmission periods of frames the same has been described above. Subsequently, an example of the processing of making transmission periods of frames the same in the above-described step S206 will be described with reference to FIG. 9.

(Processing of Making Transmission Periods of Frames the Same)

Figure 9:
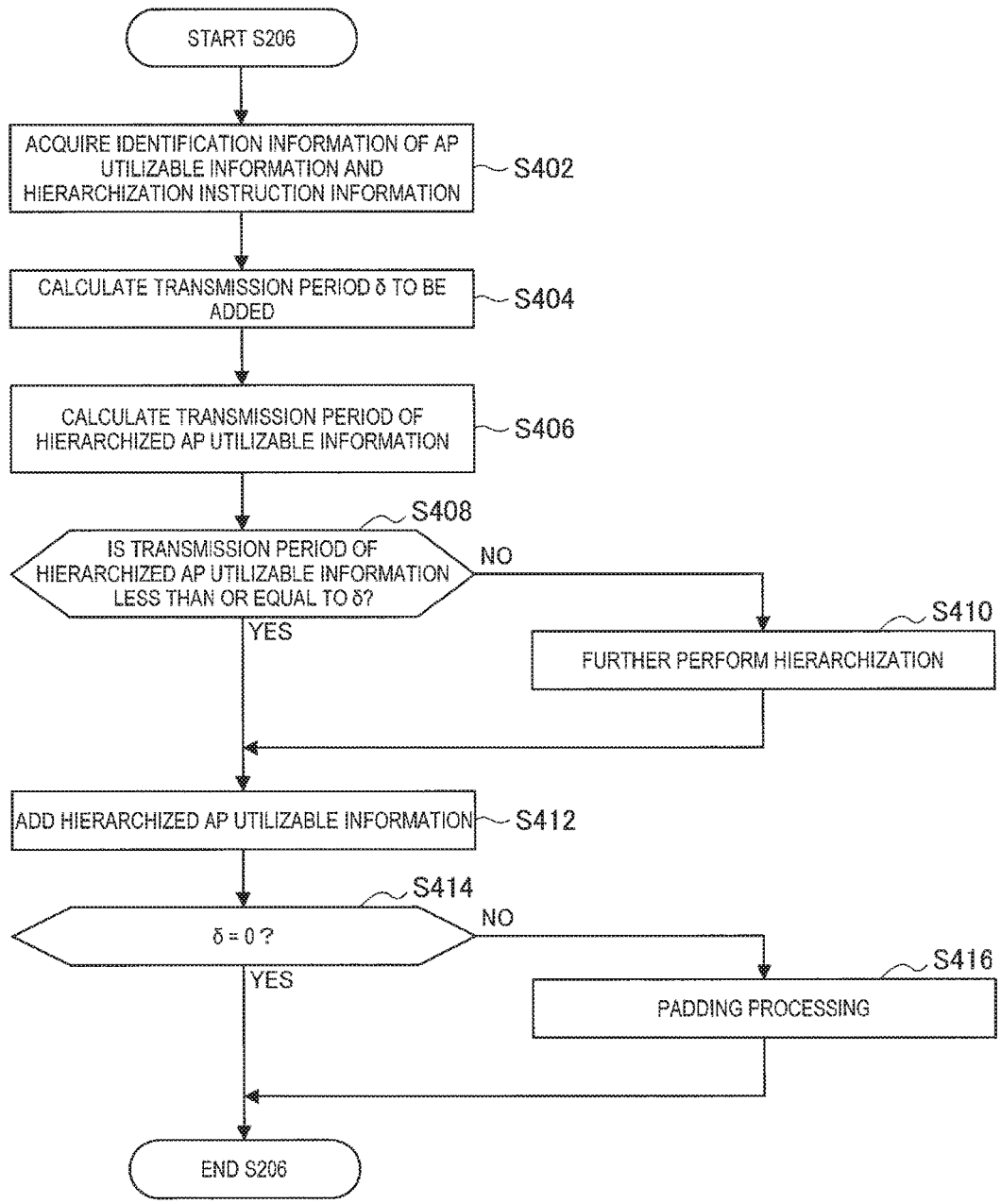
FIG. 9 is a flowchart illustrating an example of flow of processing of making transmission periods of frames the same, to be executed at the STA according to the present embodiment.

FIG. 9 is a flowchart illustrating an example of flow of processing of making transmission periods of frames the same, to be executed at the STA 200 according to the present embodiment.

As illustrated in FIG. 9, first, in step S402, the control unit 230 acquires identification information of the AP utilizable information and the hierarchization instruction information. For example, the control unit 230 acquires these information from the multiplexing instruction information included in the transmission allowance signal.

Then, in step S404, the control unit 230 calculates a transmission period δ to be added. For example, the control unit 230 calculates a difference between the designated transmission period T and the transmission period $t_{frame}$ of the frame to be transmitted as the transmission period δ to be added. Note that, in processing thereafter, in the case where some information is added to the frame, the control unit 230 updates the transmission period δ to be added. For example, the control unit 230 sets a difference between the designated transmission period T and a sum of the transmission period $t_{frame}$ of the frame to be transmitted and a transmission period for the added information as the transmission period δ to be added.

Then, in step S406, the control unit 230 calculates a transmission period of the hierarchized AP utilizable information. For example, first, the control unit 230 hierarchizes the AP utilizable information indicated in the identification information acquired in step S402 on the basis of the hierarchization instruction information. The control unit 230 then calculates a transmission period required for transmitting the hierarchized AP utilizable information.

Then, in step S408, the control unit 230 determines whether the transmission period of the hierarchized AP utilizable information is less than or equal to the transmission period δ to be added.

In the case where it is determined that the transmission period is less than or equal to the transmission period δ to be added (S408/Yes), in step S412, the control unit 230 adds the hierarchized AP utilizable information to the frame. For example, the control unit 230 adds one or more pieces of the hierarchized AP utilizable information after a data frame. Further, the control unit 230 stores information relating to hierarchization in at least one of a header of the frame and a predetermined field within a frame body.

On the other hand, in the case where it is determined that the transmission period is not less than or equal to the transmission period δ to be added (S408/No), in step S410, the control unit 230 further performs hierarchization. For example, the control unit 230 calculates the number of groups to be divided so that the transmission period of the further hierarchized data becomes a maximum transmission period which does not exceed the transmission period δ to be added. The control unit 230 then divides the hierarchized AP utilizable information into the number of groups and sets one piece of the data as information to be added to the frame. Then, in step S412, the control unit 230 adds the further hierarchized AP utilizable information to the frame. Further, the control unit 230 stores the information relating to hierarchization in at least one of the header of the frame and the predetermined field within the frame body.

Subsequently, in step S414, the control unit 230 determines whether the transmission period δ to be added is 0. Note that the transmission period δ to be added is updated by the above-described addition of information in step S412.

In the case where it is determined that δ is not 0 (S414/No), in step S416, the control unit 230 performs padding processing so that δ=0, and finishes the processing.

On the other hand, in the case where it is determined that δ=0 (S414/Yes), the control unit 230 finishes the processing.

The processing of making transmission periods of frames the same has been described above. Subsequently, an example of the frame reception processing at the AP 100 will be described with reference to FIG. 10.

(Frame Reception Processing)

Figure 10:
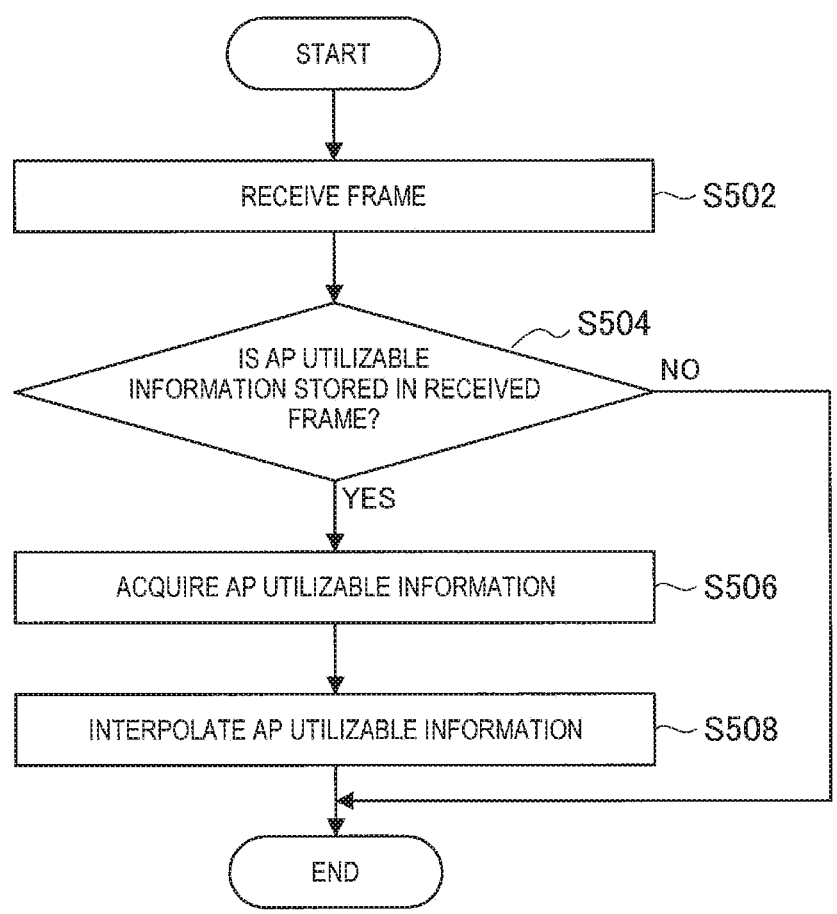
FIG. 10 is a flowchart illustrating an example of flow of frame reception processing to be executed at the AP according to the present embodiment.

FIG. 10 is a flowchart illustrating an example of flow of the frame reception processing to be executed at the AP 100 according to the present embodiment.

As illustrated in FIG. 10, first, in step S502, the radio communication unit 110 receives the frame transmitted from the STA 200.

Then, in step S504, the control unit 130 determines whether the AP utilizable information is stored in the received frame. For example, the control unit 130 performs this determination by referring to the information relating to hierarchization stored in the received frame.

In the case where it is determined that the AP utilizable information is not stored in the received frame (S504/No), the processing is finished.

On the other hand, in the case where it is determined that the AP utilizable information is stored in the received frame (S504/No), in step S506, the control unit 130 acquires the AP utilizable information.

Then, in step S508, the control unit 130 interpolates the AP utilizable information. For example, in the case where the AP utilizable information stored in the received frame is hierarchized information, the control unit 130 estimates information which has not been received yet using only the received information among the AP utilizable information.

The frame reception processing has been described above.

<3. Second Embodiment>

The present embodiment is an embodiment relating to MU-MIMO of the DL. First, configurations of the AP 100 and the STA 200 according to the present embodiment will be described.

[3-1. Configuration Example of AP]

The configuration of the AP 100 according to the present embodiment is as illustrated in FIG. 2. However, the AP 100 according to the present embodiment has substantially the same functions as those of the STA 200 according to the first embodiment. In the following description, a characteristic configuration of the AP 100 according to the present embodiment will be described while description of substantially the same functions as those of the STA 200 according to the first embodiment will be omitted.

In the present embodiment, one AP 100 multiplexes frames and transmits the multiplexed frames to a plurality of STAs 200. Therefore, the control unit 130 performs control so that transmission periods of all the frames to be multiplexed and transmitted become the same as the longest transmission period among the frames to be multiplexed and transmitted. For example, the control unit 130 adds information which can be utilized by the STA 200 which is a transmission destination to each of the frames to be transmitted within such a range that the transmission periods do not exceed the transmission period of the frame of the longest transmission period among the frames to be multiplexed and transmitted. The information which can be utilized by the STA 200 will be hereinafter also referred to as STA utilizable information.

Typically, in the present embodiment, the transmission allowance request signal and the transmission allowance signal do not have to be transmitted/received. In this case, the control unit 130 voluntarily determines the hierarchization method, the STA utilizable information to be added, or the like. Of course, as will be described below, the transmission allowance request signal and the transmission allowance signal may be transmitted/received.

The control unit 130 according to the present embodiment controls the radio communication unit 110 to transmit the transmission allowance request signal to the STA 200. The control unit 130 then acquires the multiplexing instruction information from the transmission allowance signal received by the radio communication unit 110. This multiplexing instruction information can include at least one of identification information of the STA utilizable information and the hierarchization instruction information. The control unit 130 performs processing of making transmission periods of frames the same on the basis of the received multiplexing instruction information. For example, the control unit 130 hierarchizes the STA utilizable information designated in the multiplexing instruction information in accordance with the hierarchization instruction information and adds the hierarchized STA utilizable information to the frame to be transmitted.

Here, the control unit 130 may set an STA 200 which is a transmission destination of data whose transmission period is the second longest among one or more STAs 200 which are transmission destinations as a transmission destination of the transmission allowance request signal. In other words, the control unit 130 may transmit the transmission allowance request signal to an STA 200 whose transmission period to which the STA utilizable information can be added is the shortest. In this case, the control unit 130 acquires the hierarchization instruction information which gives an instruction to perform hierarchization most finely by comparing the hierarchization instruction information with the hierarchization instruction information stored in transmission allowance signals returned from other STAs 200. By this means, the control unit 130 can add the hierarchized STA utilizable information to the frame to be transmitted to each of the STAs 200 on the basis of the acquired hierarchization instruction information without performing further hierarchization.

The characteristic configuration of the AP 100 according to the present embodiment has been described above.

[3-2. Configuration Example of STA]

The configuration of the STA 200 according to the present embodiment is as illustrated in FIG. 3. However, the STA 200 according to the present embodiment has substantially the same functions as those of the AP 100 according to the first embodiment. In the following description, a characteristic configuration of the STA 200 according to the present embodiment will be described while description of substantially the same functions as those of the AP 100 according to the first embodiment will be omitted.

For example, the control unit 230 according to the present embodiment determines whether to allow transmission in accordance with the transmission allowance request signal received from the AP 100. In the case where the control unit 230 allows transmission, the control unit 230 controls the radio communication unit 210 to transmit the transmission allowance signal. In this event, the control unit 230 may store the multiplexing instruction information including at least one of identification information of the STA utilizable information to be requested and the hierarchization instruction information in the transmission allowance signal.

Further, the control unit 230 controls processing of the radio communication unit 210 using the STA utilizable information included in the frame received by the radio communication unit 210. For example, the control unit 230 performs single user beamforming, link adaptation, transmission power control, or the like. For example, in the case where a state of the channel is extremely favorable, the control unit 230 can reduce power consumption of the STA 200 by controlling the radio communication unit 210 to reduce transmission power.

The characteristic configuration of the STA 200 according to the present embodiment has been described above.

[3-3. Operation Processing Example]

The operation processing in the present embodiment is similar to operation processing in which the AP 100 is exchanged for the STA 200 in the operation processing in the first embodiment. In the following description, processing of determining whether to implement processing of making transmission periods of frames the same, which is characteristic operation processing in the present embodiment will be described.

Figure 11:
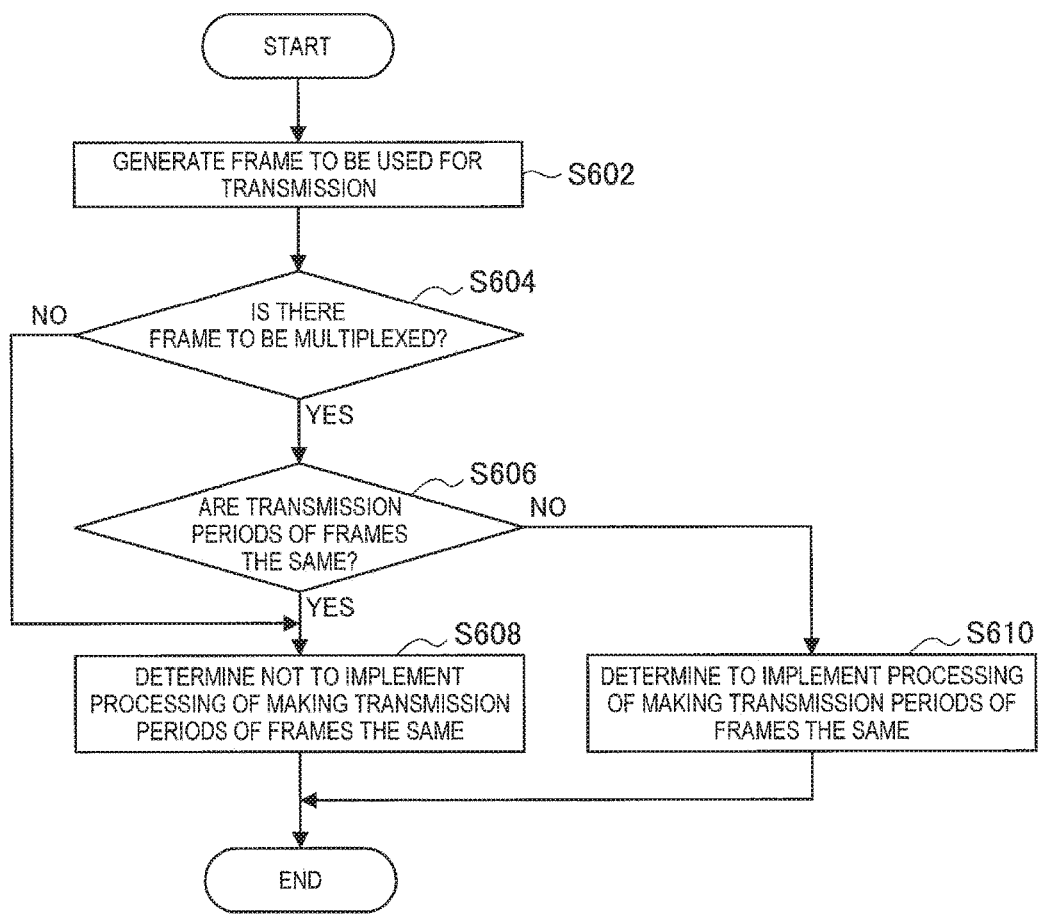
FIG. 11 is a flowchart illustrating an example of flow of processing of determining whether to implement processing of making transmission periods of frames the same, to be executed at the AP according to the present embodiment.

FIG. 11 is a flowchart illustrating an example of flow of processing of determining whether to implement processing of making transmission periods of frames the same, to be executed at the AP 100 according to the present embodiment.

As illustrated in FIG. 11, first, in step S602, the control unit 130 generates a frame to be used for transmission.

Then, in step S604, the control unit 130 determines whether there exists a frame to be multiplexed.

In the case where it is determined that there exists a frame to be multiplexed (S604/Yes), in step S606, the control unit 130 determines whether transmission periods of frames to be multiplexed are the same.

In the case where it is determined that the transmission periods of the frames are the same (S606/Yes), in step S608, the control unit 130 determines not to implement processing of making transmission periods of frames the same. Also in the case where it is determined that a frame to be multiplexed does not exist in the above-described step S604 (S604/No), in step S608, the control unit 130 determines not to implement processing of making transmission periods of frames the same.

On the other hand, in the case where it is determined that the transmission periods of the frames are not the same (S606/No), in step S610, the control unit 130 determines to implement processing of making transmission periods of frames the same.

The processing of determining whether to implement processing of making transmission periods of frames the same has been described above.

<4. Third embodiment>

The present embodiment is an embodiment in which the AP 100 and the STA 200 perform communication using a frequency division multiplex scheme and a time division multiplex scheme.

[4-1. Configuration Example of AP]

The configuration of the AP 100 according to the present embodiment is as illustrated in FIG. 2, and the AP 100 has substantially the same functions as those of the AP 100 according to the first embodiment. In the following description, a characteristic configuration of the AP 100 according to the present embodiment will be described while description of substantially the same functions as those of the AP 100 according to the first embodiment will be omitted.

The radio communication unit 110 according to the present embodiment has a function of performing processing relating to frequency division and time division multiplexing. For example, the radio communication unit 110 has a function for performing communication using orthogonal frequency-division multiple access (OFDMA). The radio communication unit 110 performs radio communication using designated radio resources (a frequency domain and a time domain) on the basis of control by the control unit 130.

The control unit 130 according to the present embodiment assigns radio resources of the time domain and the frequency domain. Here, as an example, an example where radio resources are assigned to three STAs 200 will be described with reference to FIG. 12.

Figure 12:
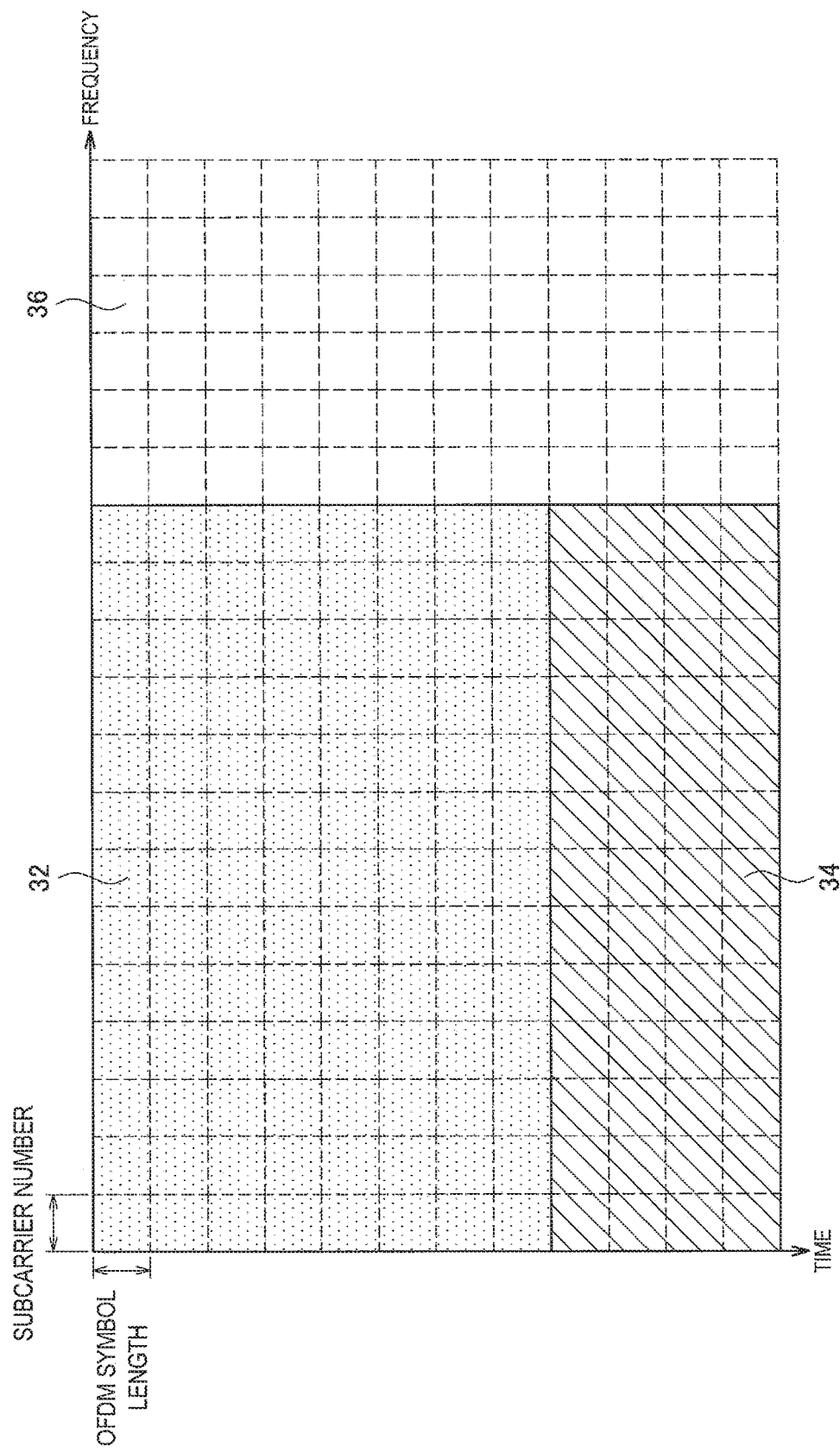
FIG. 12 is a diagram illustrating an example of assignment of radio resources according to the present embodiment.

FIG. 12 is a diagram illustrating an example of assignment of radio resources according to the present embodiment. In the example illustrated in FIG. 12, the control unit 130 divides radio resources into resource blocks 32, 34 and 36. The control unit 130 then assigns the resource blocks 32 to 36 to the STA 200 which is a transmission source of the transmission allowance request signal and other two STAs 200 whose frames are to be multiplexed with the frame of the STA 200. The control unit 130 may determine the size of the resource block to be assigned to each STA 200 on the basis of information included in the transmission allowance request signal. Note that, as illustrated in FIG. 12, the resource block is formed with one or more subcarriers and one or more OFDMA symbols.

Further, the control unit 130 stores information indicating the assigned radio resources in the multiplexing instruction information. In this event, the control unit 130 stores the information indicating the radio resources assigned to the respective STAs 200 in association with the identification information of the respective STAs 200.

The characteristic configuration of the AP 100 according to the present embodiment has been described above.

[4-2. Configuration Example of STA]

The configuration of the STA 200 according to the present embodiment is as illustrated in FIG. 3, and the STA 200 has substantially the same functions as those of the STA 200 according to the first embodiment. In the following description, a characteristic configuration of the STA 200 according to the present embodiment will be described while description of substantially the same functions as those of the STA 200 according to the first embodiment will be omitted.

The radio communication unit 210 according to the present embodiment has a function of performing processing relating to frequency division and time division multiplexing. For example, the radio communication unit 210 has a function for performing communication using OFDMA. The radio communication unit 210 performs radio communication using designated radio resources (a frequency domain and a time domain) on the basis of control by the control unit 230.

The control unit 230 according to the present embodiment controls processing of adding the AP utilizable information to the frame within such a range that transmission can be performed using the frequency domain and the time domain indicated in the assigned radio resources. Specifically, the control unit 230 additionally transmits the AP utilizable information within such a range that transmission can be performed using subcarriers and OFDMA symbols designated in the multiplexing instruction information. For example, the control unit 230 uses a resource block which is not used for transmission of data among the assigned resource blocks, for transmission of the AP utilizable information. By this means, the STA 200 according to the present embodiment can consume the assigned radio resources without leaving the assigned radio resources.

The characteristic configuration of the STA 200 according to the present embodiment has been described above.

Note that, while an example where frequency division multiplexing and time division multiplexing are performed has been described above, only one of frequency division multiplexing and time division multiplexing may be performed.

Further, while the description relating to the UL has been provided above, the same will also apply to the DL.

<5. Application Examples>

The technology according to the present disclosure can be applied to various products. For example, the STA 200 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. Further, the STA 200 may be realized as terminals (also referred to as machine type communication (MTC) terminals) which perform machine to machine (M2M) communication, such as smart meters, vending machine, remote monitoring devices and point of sale (POS) terminals. Furthermore, the STA 200 may be wireless communication modules mounted in such terminals (for example, integrated circuit modules configured in one die).

For example, the AP 100 may be realized as a wireless LAN access point (which is also referred to as a wireless base station) that has no router function or has a router function. The AP 100 may be realized as a mobile wireless LAN router. Furthermore, the AP 100 may be wireless communication modules mounted in such devices (for example, integrated circuit modules configured in one die).

[5-1. First Application Example]

Figure 13:
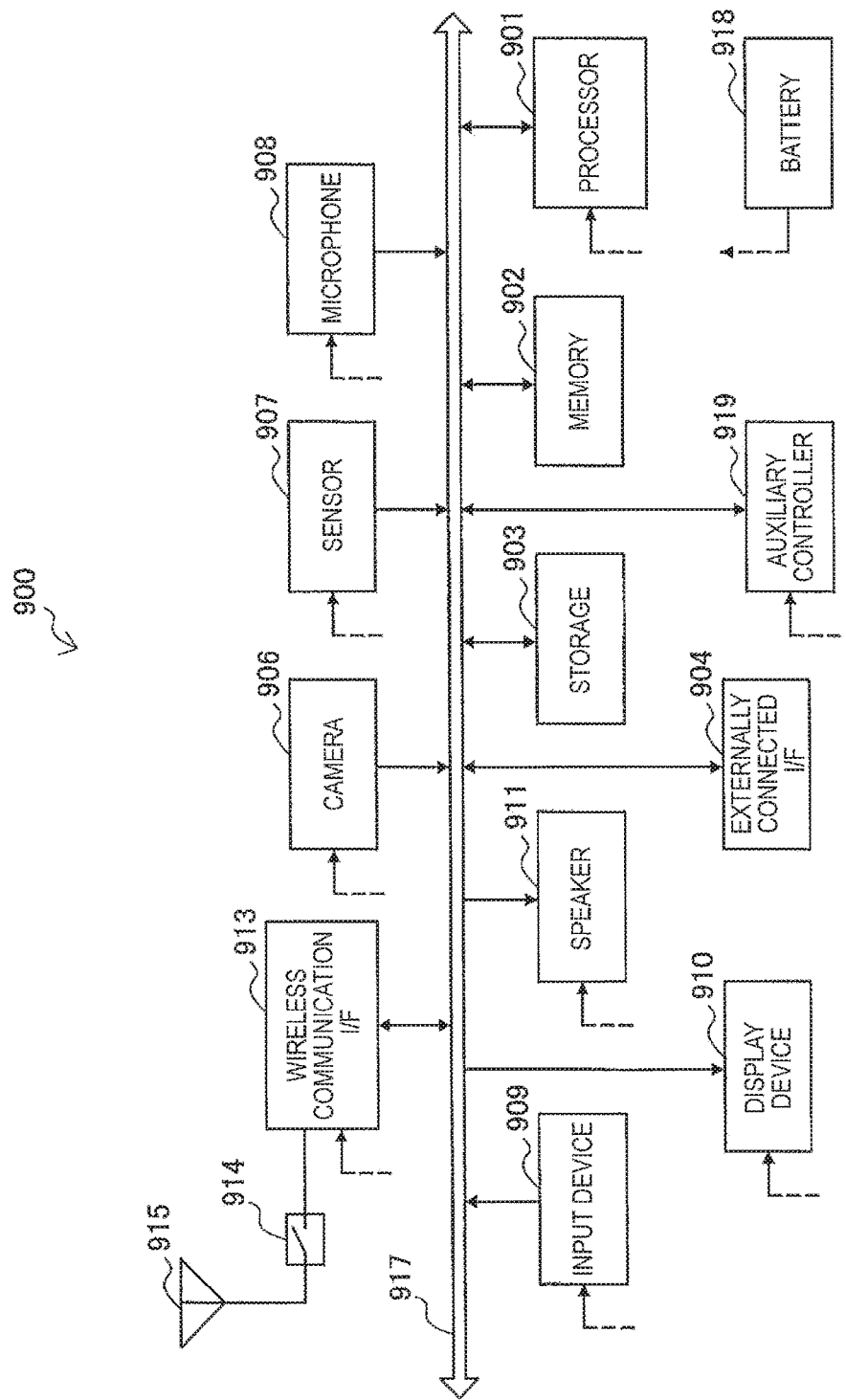
FIG. 13 is a block diagram showing an example of a schematic configuration of a smartphone.

FIG. 13 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Wi-Fi Direct is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 13. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 13 via power supply lines partially indicated by dashed lines in the drawing. The auxiliary controller 919 causes, for example, required minimum functions of the smartphone 900 to be operated in a sleep mode.

In the smartphone 900 illustrated in FIG. 13, one or more components (for example, at least one of the radio communication unit 210, the storage unit 220 and the control unit 230) included in the STA 200 described using FIG. 3 may be implemented at the radio communication interface 913. Further, at least part of these components may be implemented at the processor 901 or the auxiliary controller 919. As an example, in the smartphone 900, a module including the radio communication interface 913, the processor 901 and/or the auxiliary controller 919 may be mounted, and the above-described one or more components may be implemented at the module. In this case, the above-described module may store a program for causing the processor to function as the above-described one or more components (in other words, a program for causing the processor to execute operation of the above-described one or more components) and may execute the program. In another example, a program for causing the processor to function as the above-described one or more components may be installed in the smartphone 900, and the radio communication interface 913, the processor 901 and/or the auxiliary controller 919 may execute the program. As described above, the smartphone 900 or the above-described module may be provided as an apparatus which includes the above-described one or more components, and a program for causing the processor to function as the above-described one or more components may be provided. Further, a readable recording medium in which the above-described program is recorded may be provided.

The smartphone 900 may operate as a wireless access point (software AP) when the processor 901 performs an access point function at an application level. The wireless communication interface 913 may have the wireless access point function.

[5-2. Second Application Example]

Figure 14:
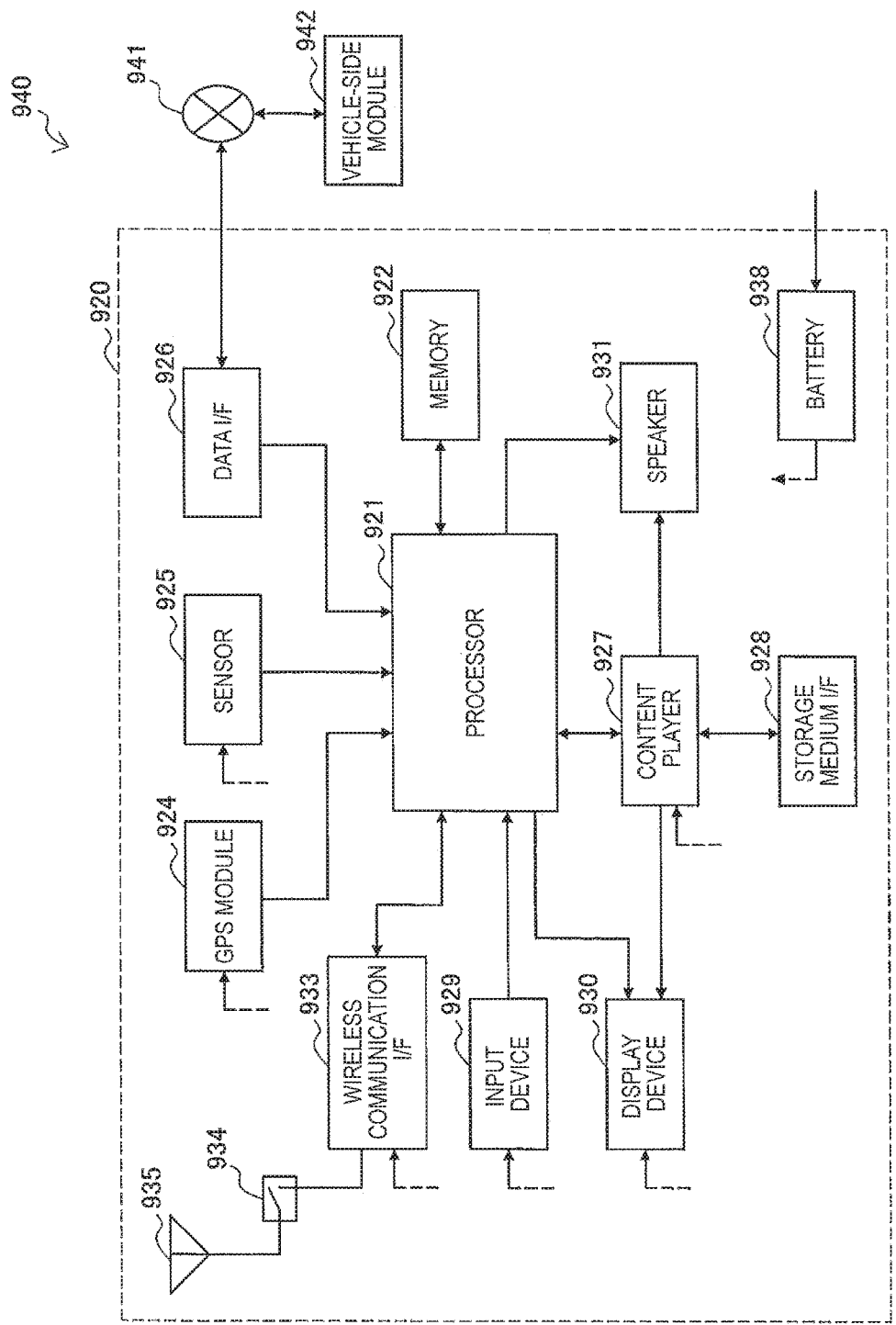
FIG. 14 is a block diagram showing an example of a schematic configuration of a car navigation device.

FIG. 14 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 14. In this case, the antenna switch 934 may be omitted from the configuration of the car navigation apparatus 920.

The battery 938 supplies electric power to each of the blocks of the car navigation apparatus 920 shown in FIG. 14 via power supply lines partially indicated by dashed lines in the drawing. In addition, the battery 938 accumulates electric power supplied from the vehicle.

In the car navigation apparatus 920 illustrated in FIG. 14, one or more components (for example, at least one of the radio communication unit 210, the storage unit 220 and the control unit 230) included in the STA 200 described using FIG. 3 may be implemented at the radio communication interface 933. Further, at least part of these functions may be implemented at the processor 921. As an example, in the car navigation apparatus 920, a module including the radio communication interface 933 and/or the processor 921 may be mounted, and the above-described one or more components may be implemented at the module. In this case, the above-described module may store a program for causing the processor to function as the above-described one or more components (in other words, a program for causing the processor to execute operation of the above-described one or more components) and may execute the program. In another example, a program for causing the processor to function as the above-described one or more components may be installed in the car navigation apparatus 920, and the radio communication interface 933 and/or the processor 901 may execute the program. As described above, the car navigation apparatus 920 or the above-described module may be provided as an apparatus which includes the above-described one or more components, and a program for causing the processor to function as the above-described one or more components may be provided. Further, a readable recording medium in which the above-described program is recorded may be provided.

The wireless communication interface 933 may operate as the above-described AP 100 to provide wireless connection to a terminal carried by a user in a vehicle.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

[5-3. Third Application Example]

Figure 15:
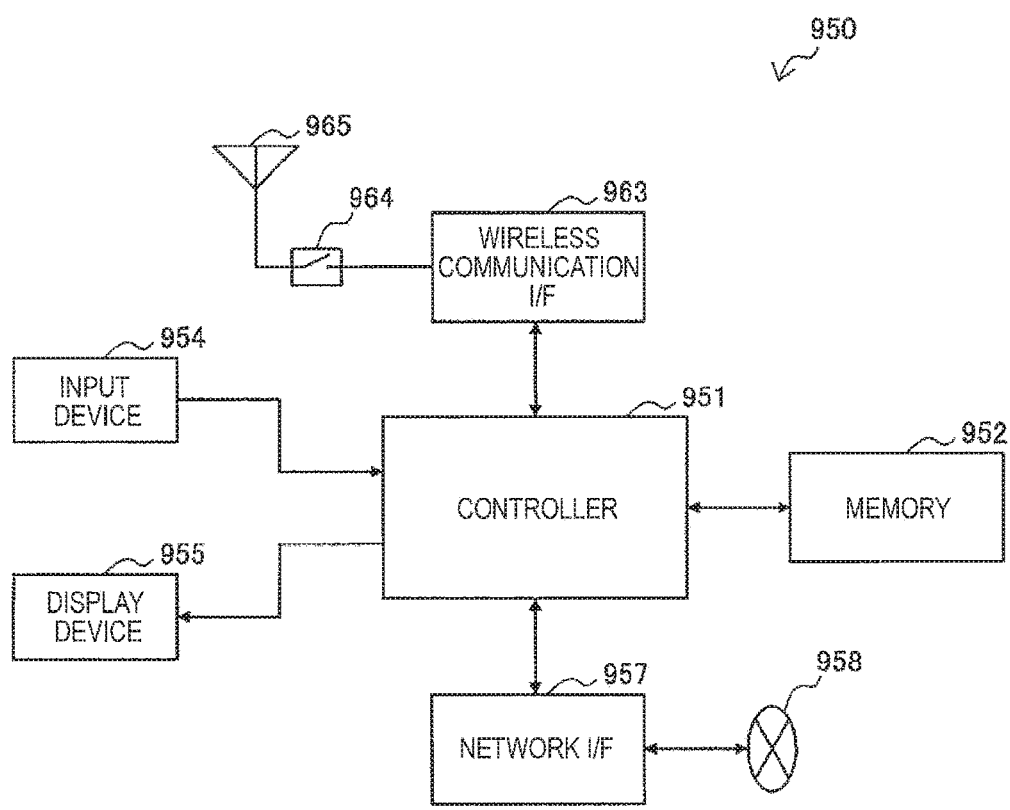
FIG. 15 is a block diagram showing an example of a schematic configuration of a wireless access point.

FIG. 15 is a block diagram showing an example of a schematic configuration of a wireless access point 950 to which a technology related to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restriction, routing, encryption, firewall, and log management) of the Internet Protocol (IP) layer and higher layers of the wireless access point 950. The memory 952 includes a RAM and a ROM and stores a program to be executed by the controller 951 and various kinds of control data (for example, a terminal list, a routing table, an encryption key, security setting, and log).

The input device 954 includes, for example, buttons or switches and receives manipulations from a user. The display device 955 includes an LED lamp or the like and displays operation status of the wireless access point 950.

The network interface 957 is a wired communication interface that connects the wireless access point 950 to the wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards of IEEE 802.11a, 11b, 11g, 11n, 11ac, and 11ad to provide a wireless connection to a terminal located nearby as an access point. The wireless communication interface 963 can typically have a baseband processor, an RF circuit, a power amplifier, and the like. The wireless communication interface 963 may be a single-chip module on which a memory that stores a communication control program, a processor that executes the program, and a relevant circuit are integrated. The antenna switch 964 switches a connection destination of the antenna 965 for a plurality of circuits included in the wireless communication interface 963. The antenna 965 has a single or a plurality of antenna elements and is used for transmission and reception of wireless signals from the wireless communication interface 963.

In the wireless access point 950 illustrated in FIG. 15, one or more components (for example, at least one of the radio communication unit 110, the storage unit 120 and the control unit 130) included in the AP 100 described using FIG. 2 may be implemented at the radio communication interface 963. Further, at least part of these functions may be implemented at the controller 951. As an example, in the wireless access point 950, a module including the radio communication interface 963 and/or the controller 951 may be mounted, and the above-described one or more components may be implemented at the module. In this case, the above-described module may store a program for causing the processor to function as the above-described one or more components (in other words, a program for causing the processor to execute operation of the above-described one or more components) and may execute the program. In another example, a program for causing the processor to function as the above-described one or more components may be installed in the wireless access point 950, and the radio communication interface 963 and/or the controller 951 may execute the program. As described above, the wireless access point 950 or the above-described module may be provided as an apparatus which includes the above-described one or more components, and a program for causing the processor to function as the above-described one or more components may be provided. Further, a readable recording medium in which the above-described program is recorded may be provided.

<6. Conclusion>

An embodiment of the present disclosure has been described in detail above with reference to FIG. 1 to FIG. 15. According to the present embodiment, the radio communication apparatus which performs radio communication with other radio communication apparatuses controls processing of adding information which can be used for communication by other radio communication apparatuses which are transmission destinations to a frame within such a range that transmission can be performed using the assigned radio resources. Because the radio communication apparatus adds information which is meaningful as data and which can be used for communication by other radio communication apparatuses which are transmission destinations to the frame to be transmitted, it is possible to realize effective utilization of radio resources.

Further, in the present embodiment, the length of the time domain of radio resources to be used by the radio communication apparatus to transmit a frame is the same as the length of the time domain of other radio resources assigned for other frames to be spatially multiplexed with the frame. By this means, frames which are to be transmitted from a plurality of radio communication apparatuses and which are to be spatially multiplexed are transmitted in the same transmission period. Therefore, at the reception side, it is possible to avoid increase or decrease of the number of times of multiplexing of frames to be received. Accordingly, precipitous change of reception power at the reception side during a reception period is avoided, so that it is possible to realize stable reception performance.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while, in the above-described embodiment, the AP 100 and the STA 200 exchange the multiplexing instruction information using the transmission allowance request signal and the transmission allowance signal, the present technology is not limited to this example. For example, an agreement relating to the multiplexing instruction information may be made in advance between the AP 100 and the STA 200. In this case, transmission/reception of the transmission allowance request signal and the transmission allowance signal upon transmission/reception of data is omitted, and a signaling amount is reduced.

The series of processes carried out by each apparatus described in the present specification may be realized by software, hardware, or a combination of software and hardware. Programs that compose such software may be stored in advance for example on a storage medium (non-transitory medium) provided inside or outside each apparatus. As one example, during execution by a computer, such programs are written into a random access memory (RAM) and executed by a processor such as a CPU.

Note that it is not necessary for the processes described in this specification with reference to the flowchart or sequence diagram to be executed in the order shown in the flowchart or sequence diagram. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A radio communication apparatus including:

a radio communication unit configured to perform radio communication with another radio communication apparatus; and a control unit configured to control processing of adding information which can be used for communication by the another radio communication apparatus which is a transmission destination to a frame within such a range that transmission is possible using an assigned radio resource.

(2)

The radio communication apparatus according to (1), wherein the control unit hierarchizes the information which can be used for communication by the another radio communication apparatus and adds the hierarchized information to the frame.

(3)

The radio communication apparatus according to (2), wherein the information which can be used for communication by the another radio communication apparatus includes channel information in the radio communication apparatus.

(4)

The radio communication apparatus according to (3), wherein the control unit hierarchizes channel information of a plurality of subcarriers in accordance with indexes of the subcarriers.

(5)

The radio communication apparatus according to (4), wherein the control unit adds the hierarchized channel information to the frame in such order that the indexes of the subcarriers included in the hierarchized channel information are separated.

(6)

The radio communication apparatus according to (3), wherein the control unit hierarchizes channel information of a plurality of subcarriers in accordance with an amplitude of a channel.

(7)

The radio communication apparatus according to (3), wherein the control unit hierarchizes each piece of channel information of a plurality of subcarriers in accordance with a bit position.

(8)

The radio communication apparatus according to (3), wherein the control unit hierarchizes channel information of a plurality of subcarriers in accordance with a phase rotation amount of a channel.

(9)

The radio communication apparatus according to any one of (2) to (8), wherein the information which can be used for communication by the another radio communication apparatus includes a coefficient to be used for beamforming.

(10)

The radio communication apparatus according to any one of (2) to (9), wherein the information which can be used for communication by the another radio communication apparatus includes information obtained by compressing a coefficient to be used for beamforming.

(11)

The radio communication apparatus according to any one of (2) to (10), wherein the control unit adds information which has not been transmitted yet among the hierarchized information to the frame.

(12)

The radio communication apparatus according to any one of (2) to (10), wherein the control unit adds difference information indicating a difference with information which has been transmitted among the hierarchized information to the frame.

(13)

The radio communication apparatus according to any one of (2) to (12), wherein the control unit stores information relating to the hierarchization in at least one of a header of the frame and a predetermined field within a frame body.

(14)

The radio communication apparatus according to any one of (1) to (13), wherein the information which can be used for communication by the another radio communication apparatus includes information measured at the radio communication apparatus.

(15)

The radio communication apparatus according to any one of (1) to (14), wherein the radio communication unit receives a transmission allowance signal from the another radio communication apparatus, and the control unit controls processing of adding the information which can be used for communication by the another radio communication apparatus to the frame in accordance with a rule stored in the transmission allowance signal.

(16)

The radio communication apparatus according to any one of (1) to (15), wherein a length of a time domain of the radio resource is the same as a length of a time domain of other radio resources assigned for other frames to be spatially multiplexed with the frame.

(17)
The radio communication apparatus according to any one of (1) to (16),
wherein the control unit controls processing of adding the information which can be used for communication by the another radio communication apparatus which is the transmission destination to the frame within such a range that transmission is possible using a frequency domain and a time domain indicated in the assigned radio resource.
(18)
A radio communication apparatus including:
a radio communication unit configured to perform radio communication with another radio communication apparatus; and
a control unit configured to acquire information which is added within such a range that transmission is possible using a radio resource assigned to the another radio communication apparatus and which can be used for communication by the radio communication unit, from a frame received by the radio communication unit.
(19)
The radio communication apparatus according to (18),
wherein the control unit estimates information which has not been received yet using information which has been received among information to be used for communication by the radio communication unit.
(20)
The radio communication apparatus according to (18) or (19),
wherein the control unit stores information indicating a rule of processing of adding information to be used for communication by the radio communication unit to the frame at the another radio communication apparatus, in a transmission allowance signal to be transmitted by the radio communication unit.
(21)
A radio communication method including:
performing radio communication with another radio communication apparatus; and
controlling, by a processor, processing of adding information which can be used for communication by the another radio communication apparatus which is a transmission destination to a frame within such a range that transmission is possible using an assigned radio resource.
(22)
A radio communication method including:
performing radio communication with another radio communication apparatus; and
acquiring, by a processor, information which is added within such a range that transmission is possible using a radio resource assigned to the another radio communication apparatus and which can be used for the radio communication, from a frame received by the radio communication unit.
(23)
A program for a computer to function as:
a radio communication unit configured to perform radio communication with another radio communication apparatus; and
a control unit configured to control processing of adding information which can be used for communication by the another radio communication apparatus which is a transmission destination to a frame within such a range that transmission is possible using an assigned radio resource.

(24)
A program for a computer to function as:
a radio communication unit configured to perform radio communication with another radio communication apparatus; and
a control unit configured to acquire information which is added within such a range that transmission is possible using a radio resource assigned to the another radio communication apparatus and which can be used for communication by the radio communication unit, from a frame received by the radio communication unit.

REFERENCE SIGNS LIST

1 radio communication system
100 AP
110 radio communication unit
120 storage unit
130 control unit
200 STA
210 radio communication unit
220 storage unit
230 control unit

The invention claimed is:
1. A first radio communication apparatus, comprising:
circuitry configured to:
control radio communication with a second radio communication apparatus which is a transmission destination;
hierarchize first information for communication by the second radio communication apparatus,
wherein the second radio communication apparatus assigns a first radio resource to the first radio communication apparatus;
control addition of the hierarchized first information to a first frame within such a range that transmission of the first frame is possible based on the assigned first radio resource;
store second information related to the hierarchization in at least one of a header of the first frame or a field within a body of the first frame; and
transmit the first frame to the second radio communication apparatus based on the assigned first radio resource, wherein the transmitted first frame includes the hierarchized first information added within the range.
2. The first radio communication apparatus according to claim 1, wherein the first information includes channel information of a plurality of subcarriers.
3. The first radio communication apparatus according to claim 2, wherein the circuitry is further configured to hierarchize the channel information of the plurality of subcarriers based on indexes of the plurality of subcarriers.
4. The first radio communication apparatus according to claim 3, wherein the circuitry is further configured to add the hierarchized channel information of the plurality of subcarriers to the first frame in such order that the indexes of the plurality of subcarriers included in the hierarchized channel information of the plurality of subcarriers are separated.
5. The first radio communication apparatus according to claim 2, wherein the circuitry is further configured to hierarchize the channel information of the plurality of subcarriers based on an amplitude of a channel.
6. The first radio communication apparatus according to claim 2, wherein the circuitry is further configured to hierarchize each piece of the channel information of the plurality of subcarriers based on a bit position.

7. The first radio communication apparatus according to claim 2, wherein the circuitry is further configured to hierarchize the channel information of the plurality of subcarriers based on a phase rotation amount of a channel.

8. The first radio communication apparatus according to claim 1, wherein the hierarchized first information includes a coefficient for beamforming.

9. The first radio communication apparatus according to claim 1, wherein
the hierarchized first information includes third information, and
the third information is based on compression of a coefficient for beamforming.

10. The first radio communication apparatus according to claim 1, wherein
the circuitry is further configured to add fourth information to the first frame, and
the fourth information has not been transmitted among the hierarchized first information.

11. The first radio communication apparatus according to claim 1, wherein
the circuitry is further configured to add difference information to the first frame, and
the difference information indicates a difference with fifth information which has been transmitted among the hierarchized first information.

12. The first radio communication apparatus according to claim 1, wherein
the circuitry is further configured to measure third information, and
the hierarchized first information includes the measured third information.

13. The first radio communication apparatus according to claim 1, wherein the circuitry is further configured to:
receive a transmission allowance signal from the second radio communication apparatus; and
add the hierarchized first information to the first frame based on a rule stored in the transmission allowance signal.

14. The first radio communication apparatus according to claim 1, wherein a length of a time domain of the assigned first radio resource for the first frame is same as a length of a time domain of second radio resources assigned for second frames to be spatially multiplexed with the first frame.

15. The first radio communication apparatus according to claim 1, wherein the circuitry is further configured to transmit the first frame to the second radio communication apparatus based on a frequency domain and a time domain indicated in the assigned first radio resource.

16. A first radio communication apparatus, comprising:
circuitry configured to:
control radio communication with a second radio communication apparatus;
store first information in a transmission allowance signal, wherein
the second radio communication apparatus hierarchizes second information, and
the first information indicates a rule for addition of the hierarchized second information to a frame;
transmit the transmission allowance signal to the second radio communication apparatus;
assign a radio resource to the second radio communication apparatus,
wherein the second radio communication apparatus transmits the frame based on the assigned radio resource;
receive the frame transmitted by the second radio communication apparatus; and
acquire the hierarchized second information and third information from the received frame, wherein
the hierarchized second information is added to the frame within such a range that the transmission of the frame is possible based on the radio resource assigned to the second radio communication apparatus,
the third information is related to the hierarchization,
the third information is stored in at least one of a header of the frame or a field within a body of the frame, and
the hierarchized second information is for communication by the first radio communication apparatus.

17. The first radio communication apparatus according to claim 16, wherein
the circuitry is further configured to estimate fourth information which has not been received,
the estimation is based on fifth information which has been received among the hierarchized second information.

* * * * *